(12) United States Patent
Gartland et al.

(10) Patent No.: US 7,440,932 B2
(45) Date of Patent: Oct. 21, 2008

(54) METHOD AND SYSTEM FOR AUTOMATING ISSUE RESOLUTION IN MANUFACTURING EXECUTION AND MATERIAL CONTROL SYSTEMS

(75) Inventors: Karl Gartland, Essex Junction, VT (US); Zhenya D. Ramphal, Hopewell Junction, NY (US); Yuji Tomita, Chiba (JP); David L. Travagline, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 10/678,822

(22) Filed: Oct. 2, 2003

(65) Prior Publication Data

US 2005/0075748 A1 Apr. 7, 2005

(51) Int. Cl.
*G06F 17/00* (2006.01)
*G06N 5/02* (2006.01)

(52) U.S. Cl. .............................. 706/46; 706/47; 706/48

(58) Field of Classification Search .................. 706/46, 706/47, 48; 702/188, 180; 700/266
See application file for complete search history.

(56) References Cited

U.S. PATENT DOCUMENTS

| | | | | |
|---|---|---|---|---|
| 4,829,445 | A | 5/1989 | Burney | 364/478 |
| 6,240,335 | B1 | 5/2001 | Wehrung et al. | 700/230 |
| 6,308,107 | B1 | 10/2001 | Conboy et al. | 700/121 |
| 6,502,213 | B1 | 12/2002 | Bowman-Amuah | 714/49 |
| 6,535,795 | B1 * | 3/2003 | Schroeder et al. | 700/266 |
| 6,853,959 | B2 * | 2/2005 | Ikeda et al. | 702/188 |
| 2001/0056335 | A1 | 12/2001 | Ikeda et al. | |
| 2005/0075748 | A1 * | 4/2005 | Gartland et al. | 700/108 |

* cited by examiner

*Primary Examiner*—Joseph P Hirl
(74) *Attorney, Agent, or Firm*—Cantor Colburn LLP; Kerry Goodwin

(57) ABSTRACT

Automatic error recovery systems and methods for automated manufacturing plants and factories are disclosed. Such facilities normally have multiple automated control systems, including an automated material handling system (AMHS), all of which run automatically, typically under the control of a computerized manufacturing execution system (MES). The disclosed issue resolution (ISR) systems and methods involve providing components, which may be supervised and operated by an issue resolution management (ISRM) system, if desired, that interfaces with the MES, AMHS, and/or production control system(s) which operate the tools and other stations within the automated factory. The components, which may be considered customized logic cells, may each be written for handling a specific kind of incoming error condition, problem or other issue that might occur and which is amenable to automatic resolution or recovery. These errors often occur between or across the boundaries of the various interactive systems and automated equipment. Each cell may cycle through a sequence of possible error resolution or recovery steps until the specific issue is resolved or until the sequence of steps is exhausted. Other components of the ISR system may provide results-oriented messages and/or facilitate the collection of data as to whether and which corrective commands from the ISR system resolved the reported error conditions automatically. The disclosed ISR systems and methods for resolving errors and other issues automatically helps improve the overall productivity of automated factories by reducing downtime and the need for human intervention to correct problems, thereby increasing factory throughput.

28 Claims, 7 Drawing Sheets

METHOD AND SYSTEM FOR AUTOMATING ISSUE RESOLUTION IN MANUFACTURING EXECUTION AND MATERIAL CONTROL SYSTEMS

BACKGROUND OF THE INVENTION

The present invention relates in general to fully automated systems and methods for operating industrial equipment, such as automated semiconductor fabrication facilities, and relates in particular to automated systems and methods for resolving error conditions and other issues which occur in manufacturing facilities which utilize automated manufacturing execution systems, material control systems and real-time dispatching systems.

Computer Integrated Manufacturing (CIM) systems used in automated IC fabrication facilities (fabs), such as a facility for processing 200 mm or 300 mm wafers, may include the following:

(1) an automated manufacturing execution system (MES) such as IBM's SiView Standard MES (from IBM Japan Industrial Solution Co., Ltd, (iiSC));

(2) an automated material handling system (AMHS) such as the Muratec material control system (MCS) from Murata Machinery, Ltd. and/or an automated reticle handling system (ARHS); and (3) an automated real time dispatcher (RTD) such as those available from IBM SiView or Brooks Automation/AutoSimulation Inc.

Still other companies provide MES, AMHS and RTD systems which could be used in place of any one of those named above in an IC fab. In all such automated facilities, the basic goals are generally the same: to operate the overall facility with high degree of efficiency, quality and flexibility, in order to maximize productivity and return-on-investment. Often times, this in turn requires optimizing product mix and output, while minimizing downtime.

When designing and building a complex automated factory, such as a fully automated 300 mm semiconductor device fabrication facility (fab), it is known to choose suppliers and vendors by evaluating their systems and components against the planned requirements of the fab using a "Best Of Breed" (BOB) process. Using this process, each system, application, or component that is believed best in the industry for the fab is selected, subject of course to availability, compatibility and cost constraints, to help achieve the objectives listed in the previous paragraph. Also, equipment in an automated plant is at times selected with a view toward meeting future requirements and/or plant expansion. Naturally, the designers and engineers responsible for bringing such an automated plant on line must deal with the inherent problems associated with integrating the many disparate pieces of equipment and their control systems as well as the overall control systems (such as the MES, MCS and RTD), all of which may collectively come from many different suppliers, as a functioning cohesive automated plant.

In these kinds of automated IC fabrication facilities, error conditions, problems and other issues such as the continued performance of the equipment and systems (e.g., percentage up-time) can arise when an automated fab is running, particularly in fully automatic mode. In the SiView Standard MES, this mode is sometimes called "Full Auto3 Mode". As in all manufacturing operations, issues will arise, such as how long can a tool, carrier or other piece of equipment be expected to run before it requires service or preventive maintenance. Inevitably, error conditions, problems and other issues arise that are not scheduled, but nevertheless must be dealt with as part of running such a facility. In the modern automated factory, such as the fab facility, these issues can include a variety of conditions or problems, which are typically documented by automatic error reporting systems for later manual analysis and follow-up. The hope and expectation is that with some further study by attending fab support personnel (such as skilled technicians and engineers), the root causes of the various errors and other issues can be determined and corrected, thereby improving overall plant efficiency, reducing cycle times, increasing yields, and improving tool availability and uptime.

Oftentimes, after support personnel have investigated, appropriate corrective actions can indeed be taken to clear an error and/or eliminate or remedy a current problem. Sometimes corrective actions can be taken on the spot. At other times, usually when the solution is not readily apparent or when considerable time and/or resources will be needed to implement a solution, the corrections may be put off until a later date or time. While it is desirable to correct error conditions to put an end to or at least to reduce the frequency of the occurrence of such errors or problems, at times all that can be done presently by the attending personnel is to take the tool equipment carrier and/or lot off-line or put it on hold so that the specific entity or object is not available to the real time dispatcher. The corrective actions needed may include resetting the tool or station or restocking the tool or station with needed supplies or raw materials. Other corrective actions may include equipment adjustment, repair, process changes and/or preventive maintenance. Actions taken to return the affected portion of the fab to productive status may also include removal of the affected work in progress (WIP), and removal or replacement of carriers, tools or tool components. A tool or station may be taken completely off-line for later debug or repair, especially when there are other identical tools or stations nearby to continue to process the carriers or other work in progress.

The problems which can be encountered in a highly automated fab environment are at least as varied and likely much more numerous than the different types of equipment and processes which are being carried out in the fab. A number of problems may relate to minor glitches or bugs in the automated material handling equipment or in their control systems, or in the interactions between control systems. An exemplary but non-exhaustive list of problems or other issues which might occur in connection with the transport of automated carriers such as front-opening unified pods (FOUPs) in such an automated manufacturing facility may include the following, which are each typically assigned a numeric code for convenient reference:

TABLE 1

Problem Codes

| Code | Description |
|---|---|
| −201 | Reject, Duplicated TrJobBID (Transport Job ID). |
| −202 | Reject, Unknown CarrierID. |
| −203 | Reject, the Carrier ID already exists in another location. |
| −204 | Reject, Unknown source location. |
| −205 | Reject, Unknown destination location. |
| −206 | Reject, Destination is full. |
| −207 | Reject, Source is not available. |
| −208 | Reject, Destination is not available. |
| −209 | Reject, Route from source to destination is not available. |
| −210 | Reject, Expected Start Time violation. |
| −211 | Reject, Expected Stop Time violation. |
| −212 | Reject, The carrier belongs to another owner. |

TABLE 1-continued

Problem Codes

| Code | Description |
|---|---|
| −213 | Reject, Batch transfer, at least one request has been rejected. |
| −214 | Reject, Pickup procedure for former job at the equipment port is not yet completed. |
| −215 | Reject, carrier is in an unknown state. |

While these automation problems do not affect product quality, they nevertheless can slow production.

As one example of how a problem can arise, consider the following. In the Full Auto3 mode, the RTD system, which includes various dispatching scripts and logic rules for each equipment ID which is being utilized, may well try to execute Start Lot Reservations even if one of the above errors are detected or encountered by the MES and/or the MCS. The RTD and MES are not programmed to logically check for or to try to resolve any of these their errors. The existing systems, which have been integrated and programmed in order to carry out certain expected functions, normally are not set up to deal with unpredictable errors, problems or other issues that may arise in any systematic way, other than to report their occurrence. This is particularly true with regard to unexpected interoperability problems that can arise between multiple systems, applications and/or pieces of equipment in the fab. These kinds of automation problems are compounded when different vendors or suppliers are responsible for different parts of the overall automated fab. Further, to our knowledge, current fab automation systems do not provide for handling (i.e., dealing with) and most importantly, resolving or recovering from such errors that occur between various systems and/or between the various pieces of equipment supplied by numerous vendors and semiconductor equipment suppliers, on an automatic basis.

The handling of such occasional errors and other seemingly random issues is a nontrivial task. Typically, trained engineers, programmers, and technicians carry out both real time and planned investigations as they try to resolve issues by diagnosing the problems at hand, and, if their time permits, determining the underlying root cause(s), and analyzing and implementing practical corrective action(s). Even for known problems, trained operators, technicians or engineers are required to intervene and interact manually with the equipment and the control systems to resolve the error conditions or other problems. Often times, they take the tool or other equipment out of auto mode and manually manipulate things or use the tool's interface to reset the tool, or sometimes even physically move objects, such as a FOUP reticle operating valves or doors, etc. in order to get the automated equipment back into production. In other words, some manual action or manual reset activity is typically required to resolve the problem and to restore the affected equipment or WIP carriers to their status of being ready to operate again in a fully automatic mode, or to take them permanently off-line until repaired in order to get them out of the way so they do not hold up production.

There are some drawbacks to using line personnel and manual intervention to resolve almost every error, problem and other issue in an automated fab. One factor justifying the added cost of developing a fully automated fab is the reliability of the AMHS to take the place of line personnel in loading and unloading a fully loaded 300 mm FOUP, which can weigh as much as 25 lbs (11.3 kg). Another is that the weight of carriers which may prove difficult for some workers to manually handle on a regular basis, thus leading to widespread use of some form of mechanical assist, cart, or automation to load and unload the FOUPs to and from the load ports of the tools. Also, in a large fab, there are many pieces of and many different types of equipment. At any given time, fab personnel may be engaged in other activities, and cannot immediately service the equipment or carrier that has just gone down. Line personnel may be involved in other important tasks or information exchanges with other operators, technicians or engineers, or with other CIM systems or controls themselves, or with other problems such as implementing corrective action or taking preventive steps elsewhere. Or they may be located some considerable distance away from the equipment which now requires attention. They may even be absent from the area, e.g., due to training classes, personal breaks or lunch. In addition, the problem areas to be manually inspected and resolved may be located well above or below the floor line or in other difficult-to-reach locations. Also, the personnel on call who are supposed to attend to the problems with the machinery or systems may not yet have had the training or experience to deal with the particular kinds of problems that have just arisen. Moreover, it is difficult for any one person to be a master of all possible corrective procedures and tasks that may arise with regard to the great variety of complex equipment and integrated CIM systems and applications found in the typical automated fab or other similarly complex automated manufacturing facility.

The typical IC fab includes very expensive equipment. Also, the memory, logic and ASIC chips being fabricated on the silicon wafers, which are sometimes referred to work in process (WIP), are often quite costly as well. Accordingly, any downtime or partial stoppages of critical processes (i.e., those that represent the typical bottlenecks to maximum production) reduce the overall productivity of the fab and thus often end up being quite costly. Thus, unplanned downtime is generally to be avoided wherever possible. However, part of the nature of the error conditions and other problems which can cause such downtime is that they are often unexpected and are quite varied. Specific problems which regularly occur with significant frequency are typically subjected to a concentrated investigation and analysis, and then manual effort to remedy such problems by eliminating the root cause(s) once and for all. Most suppliers of the automated equipment also go to considerable lengths to ensure that their individual pieces of equipment are robust and reliable. They have worked out many of the known issues with their equipment, which often leaves the infrequently occurring, seemingly random or truly oddball problems as the typical kinds of errors or other issues that crop up on the factory floor. Under such circumstances, it is often difficult to determine the cause(s) of such problems. For example, a certain reported error condition may have a few different possible causes. Accordingly, the conventional practice is to restore the equipment and the WIP carriers to operational status quickly, and then later deal with such relatively infrequent or isolated error conditions as time permits, often through painstaking manual investigation and analysis. This follow-up work is often done by well-trained personnel, who may consult the historical data which accumulates relative to these error conditions in order to hopefully understand them, to identify root causes thereof, and to determine what corrective action to take.

Accordingly, in order to reduce downtime and to restore tools, equipment and carriers to fully functioning automated status quickly, we have recognized it would be highly desirable to find an automated way to deal with as many of the myriad errors, problems and other issues which can arise from time to time in an automated manufacturing facility as is practical to do so. This would be particularly desirable in complex manufacturing facilities that employ several different types of CIM systems and applications, and many different kinds of complex equipment and tools. In that kind of environment, the act of restarting multiple automatic systems for that part of the plant which has gone down can be time-consuming and a highly complex task in itself, even for trained engineers, programmers or line personnel.

SUMMARY OF THE INVENTION

In light of the foregoing drawbacks and difficulties associated with manual techniques for handling and recovering from errors, problems and other issues which reduce productivity in an automated manufacturing facility, such as an IC fab, there are provided in accordance with the present invention, novel systems and methods for automatic resolution and recovery from at least certain perceived or reported problems, error conditions, and other issues where it is practical to do so. These novel systems and methods thereby help increase productivity and faster turn around times, reduce downtime and cycle times, and even at times reduce labor costs. The systems and methods of the present invention for resolving such errors or other issues may by way of example employ software systems and techniques as described below. When the systems or methods of the present invention are employed in an automated manufacturing system, the burden of detecting and responding to many of the problems for which characterized solutions have been developed is largely removed from the attending human service personnel, including engineers, technicians and/or operators. Instead, as will be further explained, the resolution and recovery is handled automatically by a supervisory issue resolution (ISR) system of the present invention or components thereof. The ISR system and its components may be implemented as separate systems or applications that are integrated with the other automated control systems, or they may be provided as part of one or more of those automated supervisory systems which control the fab's overall operation.

As will be further described below, we have noted there are situations which can be automatically corrected by taking certain steps, such as but not limited to, shunting bad WIP or malfunctioning carriers of WIP aside, or taking the stalled tool or other equipment off-line and shunting the other carriers or other WIP around the off-line tool or equipment to other tools and equipment that are still functioning. There are still other situations we have noted which can be corrected automatically by partially reversing certain steps that have already been taken or partially cycling certain elements within a tool or other piece of equipment. Also, we have noted that at times it may be possible to clear or reset electronically one or a plurality of error flags or other process flags, and attempt to repeat the same steps, with hopefully acceptable results the second or third time around. Further, as is described below, certain preventive steps in accordance with the methods of the present invention can be taken so that a detected problem in one area does not cause still other tools, bays, stations, transfer points, or transport mechanisms or the like further up or down the chain of stations, bays or other equipment to be shut down or rendered idle due to transport congestion or blockages within the interbays and intrabays of the overall manufacturing system.

It is useful here to summarize certain elements that the automatic issue resolution systems and methods of the present invention may well contain, followed by a summary of certain advantages which result from use of the systems and methods of the present invention. A first exemplary embodiment of an issue resolution (ISR) system of the present invention is for use in an automated manufacturing facility for running automatic production. Such a facility usually has a plurality of pieces of automated equipment, such as stations, tools and transport mechanisms, designed to carry out certain tasks and having interactive control systems which help coordinate the work or tasks being carried out at or through interconnected stations, tools and/or transport mechanisms. This exemplary embodiment of the ISR system is for automatically resolving identified issues that are or may be interfering with automatic production in such a facility. The system preferably comprises: an automated issue resolution management (ISRM) system for directing attempts to automatically resolve issues, preferably including error conditions, relating to the automated manufacturing facility brought to its attention. The ISRM system includes a plurality of components whose operations the ISRM system coordinates. Those components include: a first component for checking whether a first issue brought to its attention is a recognized issue for which an automatic resolution appears to be available, and a second component for commanding the taking of corrective action by a portion of the automated manufacturing facility in response to an issue recognized by the first component. Also, if desired, additional components may be added. These include a third component for determining whether the automated corrective action appears to have resolved the recognized issue, and a fourth component for logging whether the automated corrective action appears to have resolved the recognized issue or error. For still more functionality, more components may be added, namely: a fifth component for providing a message indicating which command for corrective action appears to have resolved the recognized issue and a sixth component, operatively arranged to receive messages from the fifth component, for logging for future reference at least part of the information contained in such messages.

The ISRM system may not always be able to respond to a reported error condition or other issue. Also, through available status information, the ISRM system may recognize that certain system or equipment states exist which preclude generating a corrective response, and it may be useful to generate a message to this effect. One way to implement this functionality is for the second component of the ISRM system to include: a first subcomponent for determining whether an automated corrective action is able to be taken at present, and a second subcomponent, in communication with the first subcomponent, for advising that an automated corrective action cannot be executed at present. If desired, the second subcomponent may be operatively arranged for advising via a first message that an automated corrective action cannot be taken because of a condition specifically identified in the first message, such as, for example, at least one piece of equipment or other automation identified in the second message not being in a required automatic mode. The automation may be a tool, a station, a transport device, a control system, a communications device, link or system, or a supervisory system, for example. This situation can occur, for example, when a support person has taken the piece of equipment or other automation in question out of automatic mode. Accordingly, the ISRM system may, if desired, put the corrective action on hold, until the piece of equipment or other automation that is off line is returned to the required automatic mode. At that time, the ISRM system may then generate corrective commands in an attempt to clear the still unresolved error condition.

The overall ISR system is preferably arranged to automatically handle a plurality of, indeed a wide variety of, different reported error conditions and other issues that are recognized as having possible automatic resolutions or recoveries. One way of achieving this functionality is to provide multiple like second components or instances of the second component within the ISRM system. At a minimum, the ISRM system should have at least a plurality of second components, with each such second component being dedicated to the resolution of a distinct recognized error condition or other issue. If desired, each second component of the ISRM system may further include a first subcomponent for providing at least first and second courses of possible corrective action, and a second subcomponent for commanding the taking of the first course of possible corrective action, and then the taking of the second possible course of corrective action if needed, and then the taking of a third course of corrective action if needed, and so on. Each such course of corrective action may involve one or more steps or actions, and these steps or actions in a particular course of action may be carried out however needed, such as but not limited to on a timed basis, or in a certain sequence, or in parallel, etc.

In practice, some automated error recovery situations may involve performing two, three, four or more possible corrective steps or courses of action, often in a certain sequence. At times, the error condition may be resolved before the end of the sequence of steps is reached. In this context, the third component may include its own first subcomponent for providing a first message indicating whether the automated corrective action appears to have resolved the error condition or other issue. Then the second component may also include another subcomponent for providing a plurality of courses of possible corrective action, including at least first and second courses of possible corrective action, and still another subcomponent for receiving the first message from the third component and deciding whether the second component needs to command the taking of another possible course of corrective action.

In the foregoing ISR system, the ISRM subsystem may be dropped in favor of a simpler system, which just includes the first and second components described above, and preferably multiple like second components, with each such second component being dedicated to the handling of a distinct recognized error condition or other issue to be resolved or recovered from. (Alternatively, multiple instances of the same generic second component, with specific command memories and other internal functionality to alter its operation to be specific to a given error condition, problem or other reported issue may be provided.) As each incoming error condition is recognized by the first component, the specific second component associated therewith can be "turned on", that is, set into motion or action independently of the other second components. That specific second component would then run until the error condition is corrected or all possible corrective actions in its command memory had been tried. As before, a third component for determining whether the automated corrective action appears to have resolved the recognized issue, and a fourth component for logging whether the automated corrective action appears to have resolved the recognized issue, may be provided. Similarly, fifth and sixth components as described above may optionally be provided. As will be further described below with regard to FIG. 6, these third, fourth and fifth components may be constructed or arranged to handle all of the second components that have been turned on or set into motion. Alternatively, multiple versions or instances of the third, fourth and fifth components may be provided and associated with one another as illustrated and further discussed in connection with FIG. 7 below.

Each of the systems of the present invention described herein normally is arranged to perform a method of the present invention. For example, it should be understood that the present invention also contemplates a method of managing automatic recoveries from error conditions in an automated factory environment that has multiple automated computer integrated manufacturing (CIM) or other computerized systems which control and supervise the operations of the factory and much of the automated equipment therein. One such method may be described as comprising the steps of: (a) installing a supervisory program for managing attempts to recover automatically from selected error conditions reported by at least one of the control systems in the automated factory; (b) determining whether incoming error conditions received by the supervisory program are recognized as issues for which an automatic resolution appears to be available. This method also includes the steps of: (c) for the first incoming error condition that is so recognized in step (b), under the auspices of the supervisory program, accessing information associated with the incoming recognized error condition to enable the generation of a first set of automated corrective commands; and (d) under the auspices of the supervisory program, generating at least a first command of corrective action to be taken by a portion of the automated factory in an effort to resolve automatically the recognized incoming error condition. If desired, this method may also include the steps of: (e) determining whether the automated corrective action taken appears to have resolved the recognized incoming error condition, and (f) logging whether the automated corrective action appears to have resolved the recognized incoming error condition. Like the systems of the present invention, the automated methods may include the steps of: (g) determining whether an automated corrective action is able to be taken at present; and (h) advising that an automated corrective action cannot be executed at present. The functionality of other aspects of the systems of the present invention described herein may also form part of the functionality associated with the steps of the methods of the present invention.

From the description thus far, it should be appreciated that the ISR systems and methods of the present invention are well-suited to overcome a variety of problems encountered when equipment and associated control systems report an error condition, problem or other issue. Indeed, armed with ISR systems and methods of the present invention, it is now practical to implement rigorous system-wide automatic solutions to help resolve many error conditions and other problems or issues in an automated manufacturing facility that are susceptible to automatic recovery or other automatic resolution, even across the normal boundaries separating the various automated systems. These and other aspects of the present invention may be further understood by referring to the detailed description, accompanying Figures, and appended claims.

BRIEF DESCRIPTION OF THE DRAWINGS

The drawings form an integral part of the description of exemplary embodiments of the present invention and are to be read in conjunction therewith. Like reference numerals designate the same or similar components or features in the various Figures, where.

DETAILED DESCRIPTION OF PREFERRED EMBODIMENTS OF THE INVENTION

The present invention is illustrated and described herein in connection with certain illustrative embodiments, with the understanding that the teachings of the present disclosure are considered to be exemplifications of the principles of the invention and the associated functional specifications required for implementation of the present invention and its several facets. However, it should be appreciated that the systems and methods of the present invention may be implemented in still different configurations and forms, and that other variations thereof are possible, based on the teachings herein.

Part I—General System Overview

Figure 1:
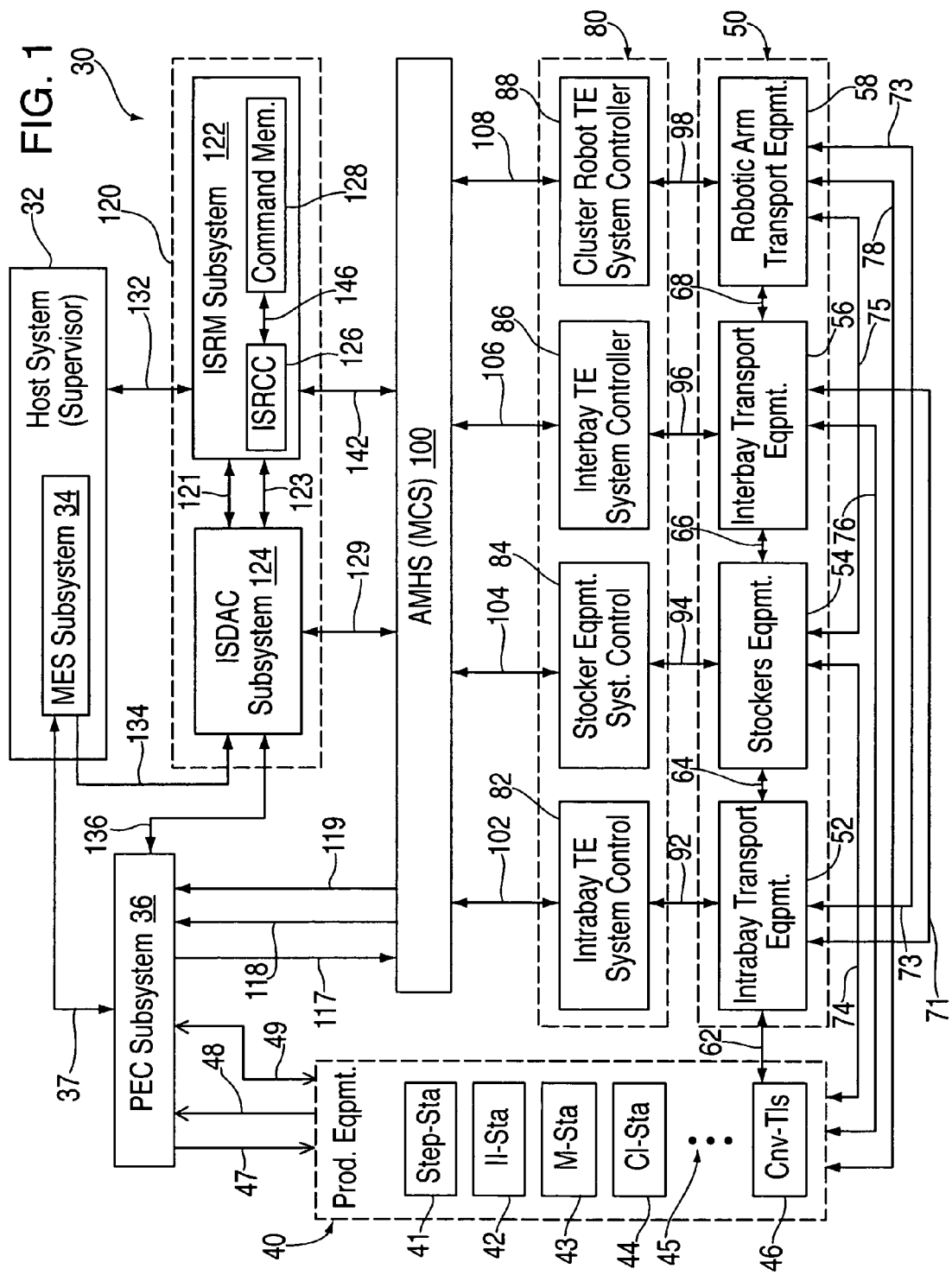
FIG. 1 is a simplified block diagram of an exemplary factory automation system, sometimes called a Computer Integrated Manufacturing (CIM) system, which shows the interconnections between the production equipment and material transport equipment and their associated computerized control systems, including the MES and AMHS (i.e., the MCS), and which shows an exemplary issue resolution system of the present invention connected thereto.

To better understand the systems and methods of the present invention, it is useful to consider, as shown in FIG. 1, a simplified block diagram showing an exemplary known factory automation (FA) system, sometimes called a Computer Integrated Manufacturing (CIM) system, in which the system of the present invention, shown in summary form in dashed block 120, is embedded and may be used to advantage. As will be more fully discussed, this system 120, its components and methods are new, while the remainder of the FA system may, for the purposes of this disclosure, be considered conventional or known. Then, it will be useful to consider a more detailed block diagram of one such known FA system as shown in FIG. 2, which may be considered as pre-existing, prior to the present invention, except for that portion thereof implementing the system, components and methods of the present invention, as are more fully described herein.

Figure 2:
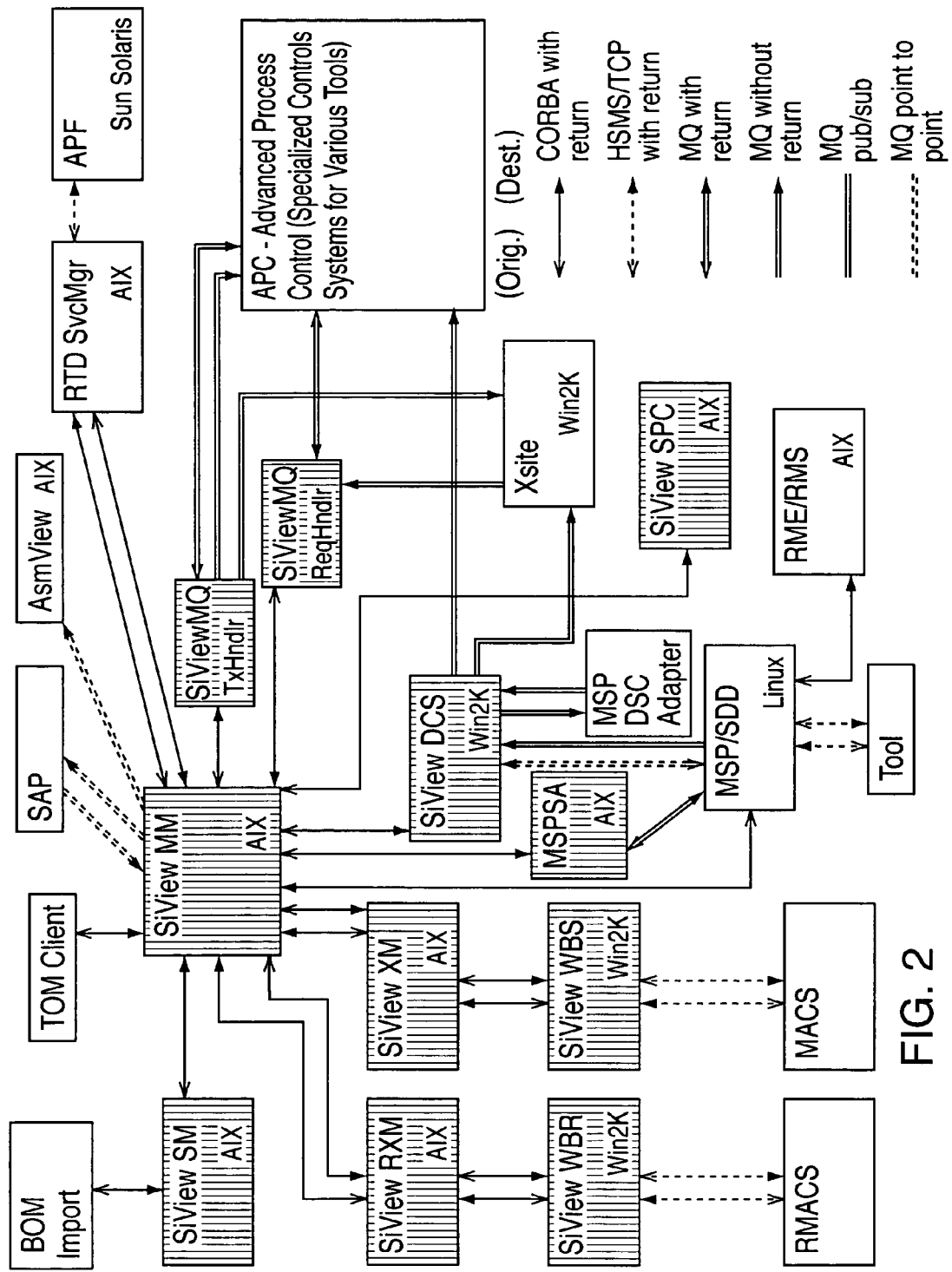
FIG. 2 is a more detailed block diagram of one practical implementation of the factory automation system of FIG. 1, which depicts many more of the various subsystems, controllers and other elements and communications paths of the overall factory automation system, including representative pieces of computer hardware used in the factory automation system.

In both FIGS. 1 and 2, the factory automation system may be implemented using an off-the-shelf systems including a manufacturing execution system (MES) such as SiView Standard from IBM, a real time dispatcher (RTD) from Brooks Automation and a material control system (MCS) from Murata. In order to integrate these disparate systems together, these products may be customized as needed using conventional techniques to provide compatible interfaces so each system may communicate properly with the other systems and thus work together. The interfaces used to enable communications such as the sending of messages between these three systems or applications are industry-standard communication protocols and thus only need be mentioned by name to be understood. These interfaces include: CORBA (Common Object Request Broker Architecture), HSMS (High Speed Message Service), and MQSeries (widely-used IBM middleware). All three of these communications protocols and interfaces are widely used by IBM and other manufacturers in the semiconductor fabrication industry as well as in other industries, in their plants and factories.

FIG. 1 is simplified high level system block diagram of a factory automation system 30 for an automated factory such as an automated IC fab. FIG. 1 shows typical major subsystems and equipment groups in the automation system of the fab, and it also shows an issue resolution (ISR) system of the present invention connected thereto. FIG. 1 also shows the general communication data flow between those subsystems and groups and the ISR system. The typical subsystems and groups will now be described, followed by a description of the ISR system. The top block 32 represents the host system (or supervisor), which includes therein a MES subsystem 34. In a typical automated IC fab, there is also a production equipment control (PEC) subsystem 36 which receives certain commands or instructions from the MES subsystem 34, relating to the desired overall operations to be carried out by the production equipment used in the fab. These commands, as well as responses from the PEC subsystem, pass over suitable communications paths represented by lines 37. In an IC fab, there are many different types of production equipment, collectively represented by block 40, whose operation must be controlled and synchronized by various PEC commands issued by the supervisor 32. The individual pieces of production equipment, which are frequently referred to as tools, typically have their own computers and/or microprocessor-based controllers, which control their own internal operation and control most if not all exchanges of information with other parts of the fab. The tools typically may include steppers 41 for performing photolithographic operations, ion implantation machines 42, metrology stations 43, cleaning stations 44, and still other stations not shown but represented by ellipses 45, which may include bonding stations, wafer thinning stations, various testing stations, and still other conventional tools represented by block 46. In larger installations, groups of identical tools or groups of like or related tools or stations may be provided in various bays. All of these tools receive PEC commands over suitable lines 47, and in turn provide various responses over lines 48. Error or problem signals may be provided over lines 49. Lines 47-49 are shown separately for sake of discussion. In practice, these and other communication lines in FIGS. 1 and 2 may all be part of one or more communication buses, token rings or daisy chains, or may be implemented in any other conventional or suitable form. In other words, these lines, like the other lines described herein, should be broadly considered as communication paths that may utilize the same or separate physical wires, coaxial cables, optical cables, optical links and wireless radio frequency links or the like.

The automated fab 30 also normally employs a large numbers of carriers of wafers or other work-in-progress (WIP) whose movement must be tracked as those carriers transport the wafers or other WIP between various tools, stations, stockers and various transport mechanisms. The carriers may be of any known or suitable type including SMIF carriers or front opening unified pods (FOUPs). Any suitable storage or shipping containers may be used including front opening shipping boxes (FOSBs). Many of the individual tools are preferably located in clusters or bays dedicated to certain kinds of processes, such as photolithography, ion implantation, metrology, cleaning, bonding, wafer thinning, testing and the like. Each such bay typically has multiple identical or related tools or other stations. At least four types of automated transport equipment may be used to transport carriers automatically between the tools or other stations, stockers and transport mechanisms. These four typical kinds of automated transport equipment are represented by the blocks in dashed large block 50. Within these individual bays will be located a variety of intrabay transport equipment collectively represented by block 52. Outside of the bays (and sometimes within) are various pieces of stocker equipment collectively represented by block 54. Also, a typical fab will have various pieces of interbay transport equipment collectively represented by block 56 between the various stockers and/or bays. The fab may also employ robots or transport vehicles, collectively represented by block 58, that transport carriers or other objects between various tools or other stations, stockers, transports and other pieces of equipment. These carrier transports and robots may be of any suitable design including but not limited to rail-based overhead transport vehicles and shuttle-mounted pivoting robotic arms, which are capable of the movement along three or more independent and often orthogonal axes. These transport robots or vehicles, sometimes also referred to as Overhead Transports (OHTs) and/or transport robots are often used to move FOUPs, FOSBs, carriers, cassettes, pods, etc. and other objects around in and between bays or efficiently-arranged clusters (not shown) of related tools, stations and other equipment within the fab.

The production equipment 40 at various locations communicates regularly with its associated interbay transport equipment 52, and this may take place over communications lines 62. The Standard E-84 (the Enhanced Carrier Handoff Parallel I/O Interface or PIO) from SEMI (the Semiconductor Equipment and Materials International organization) is often used for this purpose. Similarly, the intrabay transport equipment 52 communicates regularly as needed with the stocker equipment 54 over lines 64. Similarly, the stocker equipment 54 communicates with interbay transport equipment 56 over lines 66. The interbay transport equipment 56 communicates with transport vehicles, robotic arms or any other type of transport equipment 58 over lines 68. Similarly, if communications were needed between the equipment blocks 52 and blocks 56 and 58, it may be provided over lines 71 and 73 respectively. Similarly, any communications needed between equipment blocks 54 and 58 may take place over lines 75. In other words, as shown by all of these lines, communications may take place between any two or more pieces of production equipment and transport equipment, or any two or more pieces of transport equipment, as may be necessary or desirable. Communications standard No. E84 (the enhanced carrier handoff parallel I/O interface or PIO) of SEMI (the Semiconductor Equipment and Materials International organization) or any other known or suitable communications protocol may be used as desired for implementing such communications over lines 47 through 78. These communication lines, as well as any other lines or communications paths referred in FIG. 1 (and the other Figures) may physically be implemented in any number of ways including electric cables (e.g., CAT5), coaxial cables, fiber optics and/or infrared systems, and short-to-medium range wireless communications systems, among others.

The control of the automated transport equipment 50 may be handled by sets of dedicated controllers shown within dashed block 80. The control all of the intrabay transport equipment 52 is preferably handled by a group 82 of dedicated system controllers. For example, command and control signals for all of the intrabay transport equipment may be routed through one or more intrabay transport system controllers represented by block 82. Similarly, the control of all of the stocker equipment 54 may be routed through or handled by one or more stocker system controllers 84, and the control of the interbay transport equipment 56 may be routed through or handled by one or more interbay transport system controllers 86. Finally, the control of all of the robot arm transports 58 may be routed through one or more transport/robot system controllers 88. Communications between transport equipment 52, 54, 56 and 58 their associated controllers 82, 84, 86 and 88 and may respectively take place over communication lines 92, 94, 96 and 98 as shown.

An automated material handling system (AMHS), which preferably is an integrated transport control system 100, such as the material control system (MCS) available from Murata, sits above the transport controllers 80 and communicates with those groups of controllers 82, 84, 86 and 88 over lines 102, 104, 106 and 108 as shown. AMHS 100 receives its commands from the host system 32 over communication lines 117 and also returns status and completed command information to the host system over lines 118. In the equipment and subsystems thus far described, it is also common for the equipment and the subsystems to provide status information, including error conditions, problem reports, and other items constituting issues to be noted, including production quantities and related information. This data may be passed between AMHS 100 and the host 32 over communication lines 119. Normally, such data is collected within the host system 32, and made available to attending personnel through various graphical user interfaces, monitors and/or through reports. The data is often collected in one or more suitable logs, files or databases which may be flat computer files, a series of tables, spreadsheets, or one or more suitable relational databases.

The conventional purpose of collecting all of this information is so that it can be examined later, when some someone desires a report, or is trying to investigate some error, diagnose a machine condition, problem or state, obtain statistics about production, part quality, tool and/or carrier performance and downtime, and/or obtain information about the various error conditions or problems which may have occurred relative to any given tool or other piece of equipment, such as a given carrier, tool or bay of tools. Also, quality control and product yield information is often collected down to the wafer level, so that the causes of production and yield problems may be investigated by attending support personnel who from time to time analyze the data trying to understand what may have happened, and when, relative to the production of certain wafers or chips of the IC products being produced in the fab.

To this conventional automated factory system 30, the present invention adds a novel issue resolution (ISR) system 120 to help automatically handle and attempt to automatically resolve at least certain kinds of error conditions, problems and other issues that arise during the automatic operation of the IC fab. Specifically, the ISR system 120 attends to problems that have been previously identified as being possibly susceptible to automatic resolution, including if possible complete recovery therefrom, so that production may continue automatically in spite of the noted error condition, problem or other issue. In other words, rather than having the automatic operation be suspended or otherwise interrupted, the ISR system 120 is often able to automatically resolve or bypass the error condition or other issue. The issue resolution system 120 may include an issue resolution management (ISRM) subsystem 122 and an issue database and collection (ISDAC) subsystem 124, which may be generally interconnected as needed to the rest of the factory automation system 30. Exemplary interconnections within and between the ISR system 120 and its subsystems and the rest of fab automation system 30 are shown in FIG. 1. ISRM system 122 may also include an issue resolution command center (ISRCC) 126 and an optional command memory component 128. ISRM subsystem 122 and ISDAC subsystem 124 preferably utilize bidirectional communications and data transfer as shown by lines 121 and 123 therebetween.

The ISDAC subsystem 124 may obtain information regarding error conditions, problems and control status from AMHS 100 directly over communication lines 129 or indirectly through information passed over other lines. Specifically, lines 48, 49, 118 and 119 provide status and error condition information to host system 32 which can be passed via lines 134 to ISDAC system 124, information (if any) that was associated with the error condition information from the production equipment control system 36. Similarly, the MES 34 may provide status and error condition information on lines 134 to the ISDAC subsystem 124. Using these techniques, and/or other well-known techniques, information about equipment and workpiece status, error conditions, problems and other issues, along with associated command information, may be collected in the databases of the ISDAC subsystem 124.

The purpose of the issue resolution management subsystem 122 is to control the overall operation of the issue resolution system 120. One way to do this is making effective use of the information collected in the issue database of the ISDAC subsystem 124, to determine when an error condition, problem or other issue has occurred which is susceptible, or is likely to be susceptible, to automatic resolution, including possibly complete recovery. When the ISRM system 122 recognizes that such error condition or other an issue has occurred, it authorizes the issue resolution command center (ISRCC) 126 to generate an appropriate set of commands to the host system 32, the production equipment 40, and/or the AMHS system 100 as necessary to attempt to resolve the error condition or other issue that has just been reported (flagged) and/or otherwise authorized for resolution. Exemplary ways in which this issue resolution system 120 and the attendant methods of the present invention may be implemented and may operate will be described further below.

Part 2—Specific System Overview

FIG. 2 is a more detailed block diagram showing a representative factory automation system for an automated IC fabrication facility used to process 300 mm silicon wafers into IC semiconductor chips or other IC products. The FIG. 2 system may use the systems and methods of the present invention in one or more of five different ways, as will be explained. Many of those skilled in the art will recognize or readily discern the meaning of the acronyms used in the FIG. 2 diagram and the purposes of the various subsystems, hardware and software components, and the interconnections therebetween. Nonetheless, to make the FIG. 2 diagram (and the other Figures) more universally understandable, the following acronym translation table is provided.

TABLE 2

Acronym Translation Table

| Acronym | Acronym Meaning (or Short Explanation) |
|---|---|
| AIX | IBM's Unix Operating System |
| AMHS | automated material handling system |
| APC | advanced process control |
| APF | AutoSimulations Inc. Productivity Family (includes RTD, Reporter, AutoSched AP, and MES integration) |
| AsmView | IBM's Assembly View MES used in the back-end-of-line (BEOL) Semiconductor Manufacturing processes such as Bond, Assembly, and Final Test. |
| BOM | Bill of Materials |
| CIM system | computer integrated manufacturing system |
| CORBA | Common Object Request Broker Architecture |
| DCS | Data Collection Server |
| EQP | equipment |
| FAS | Factory Automation System |
| FOUP | front opening unified pod |
| HSMS | High Speed Message Service |
| MACS | Murata Automation Control System |
| MCS | Material Control System |
| MES | Manufacturing Execution System |
| MM | Material Manager (part of the SiView MES) |
| MQ ReqHdlr | MQ Request Handler (converts MQ messages into CORBA messages) |
| MQ (Series) | widely-used business integration software (middleware) from IBM |
| MQ TxHdlr | MQ Transaction Handler (converts CORBA messages into MQ messages) |
| MSP | Machine supervisory program (a/k/a Tool Application Program = TAP, Cell Controller, Tool Controller, etc.) |
| MSPSA | MSP SiView Adapter (converts CORBA messages into MQ messages) |
| OHT | overhead transport |
| ReqHandr | Request Handler |
| RMACS | Remote Murata Automation Control System |
| RME | Recipe Management Editor |
| RMS | Recipe Management System |
| RTD | real time dispatching |
| RTD SvcMgr | RTD Service Manager |
| RXM | Reticle Transaction Manager (SiView Standard Component) |
| SAP | common corporate database from SAP used for many purposes |
| SDD | SECS data disperser |
| SECS | SEMI Equipment Communications Standard |
| SiView DCS | Data Collection Server—SiView Standard Component |
| SiView MM | material manager—SiView Standard component |
| SiView MQ | SiView's MQ Series Component (for processing transmission/text commands and requests from other systems) |
| SiView RXM | Reticle Transaction Manager—SiView Standard Component |
| SiView SM | Specification Manager—SiView Standard Component |
| SiView SPC | statistical process control—SiView Standard Component |
| SiView Std. | IBM's reliable and extensible MES solution |
| SiView WBR | Within Bay Reticle—a SiView Standard Component |
| SiView WBS | Within Bay System—SiView Standard Component |
| SiView XM | Transaction Manager—SiView Standard Component |
| SPC | statistical process control |
| TCS | Transfer Control System |
| TOM Client | Total Order Management Client |
| Tx | transaction |
| TxHandlr | Transaction Handler |
| WBR | With Bay Reticle |

TABLE 2-continued

Acronym Translation Table

| Acronym | Acronym Meaning (or Short Explanation) |
|---|---|
| WBS | Within Bay System |
| Win2K | MS Windows 2000 |
| WIP | work in progress |
| WTDG | Watchdog (monitors equipment status and availability) |
| XM | Transaction Manager (SiView Standard Component) |
| XMS | Transaction Management System |
| Xsite | Brooks Automation Preventive Maintenance Software System |

In addition, in the lower right-hand corner of FIG. 2, there is provided in a dashed box a key to the different types of communications paths used therein. Armed with the foregoing table and key, those skilled in the art of designing controls for automated IC fabs should readily understand and appreciate the functions and purposes of virtually all objects and interconnections therein.

In FIG. 2, in the lower right-hand corner of some of the boxes, an operating system (OS) is specified, such as AIX (which is IBM's Unix-based operating system), Linux, Sun Solaris, and Win2K (MS Windows 2000). These notations represent exemplary operating systems under which the specific applications listed in upper center of the same boxes may respectively be run. These applications and associated operating systems are run on a plurality of different computer hardware systems to provide for separation of functions, administration, modularity, redundancy and/or security in known manner. Also, depending upon the customer, user or supplier of the specific application or the associated equipment to be controlled, some operating systems may be more often used than others for certain applications or systems shown in FIG. 2. Similarly, certain fab owners or vendors of automated equipment and/or material handling systems and/or related control systems may prefer certain communication protocols or types of communication paths in (e.g., wireless vs. coax cable vs. twisted pair vs. optical), and such choices often depend upon location, speed requirements and other known factors.

FIG. 2 shows an exemplary mix of such automation systems and applications and communications therebetween. For example, the MSPSA is an MSP SiView adapter that converts CORBA messages into MQ series messages, the SiView Transactions Handler converts CORBA messages into MQ Series messages, and the SiView MQ Request Handler converts MQ messages into CORBA messages. The choice of operating systems and/or communications protocols used for or to communicate with a given application, computer system or piece of equipment may be of practical concern at times to engineers. But such choices are not of concern relative to the systems and methods of the present invention, which may be implemented and used in conjunction with any of these operating systems, applications, equipment, control systems and communication protocols and paths. Further, the systems and methods of the present invention can be applied in a wide variety of computer-based or electronic/microcontroller-based automated systems and automatic equipment used in an automated fab or other automated production facilities.

As will be seen in FIG. 2, when the SiView Standard MES is used, its MM (Material Manager) is (or may be viewed as) the brain or central controller for the entire fab. Having the MM function as the central controller is a common paradigm used by most manufacturing execution systems in the IC fabrication industry. The SiView MES is made up of multiple components (which may be considered subsystems) such as the XM, RXM, WBS, and WBR components. Still other components are shown and identified by the designation "SiView Standard Component" in the foregoing table. These four components just named allow and provide the logic flow from the MES to the MCS. In one embodiment of this FIG. 2 automation factory, the Brooks RTD Service Manager (RTD Dispatcher) may have its own logic and customized rules for every tool or piece of equipment in the fab. It is known to utilize customized rules and logic to help create lists of the products that should be run or processed on the tools in what is commonly referred to as the Dispatch List, or "What's Next" List. The RTD, using the customized programmable logic in known manner, tells the MES What's Next to process for every tool in the fab, based on schedules, priorities, commit dates, etc. Whether or not an off the shelf RTD system such as Brooks RTD is used is not important, as any automated fab using an MES will have this general kind of scheduling and/or dispatching logic resident somewhere in the MES or CIM system. The RTD or dispatcher may be built in as part of the MES, may be a separate component of the MES, such as the SiView Dispatcher (which in the FIG. 2 system is not used or implemented) or it could be a third party application such as the Brooks Automation RTD. The idea or concept of the scheduler, dispatcher, or MES selecting which product(s) to run next through the automated factory based on rules or logic is common no matter which MES is used in virtually any industry, and thus need not be further described here.

Figure 3:
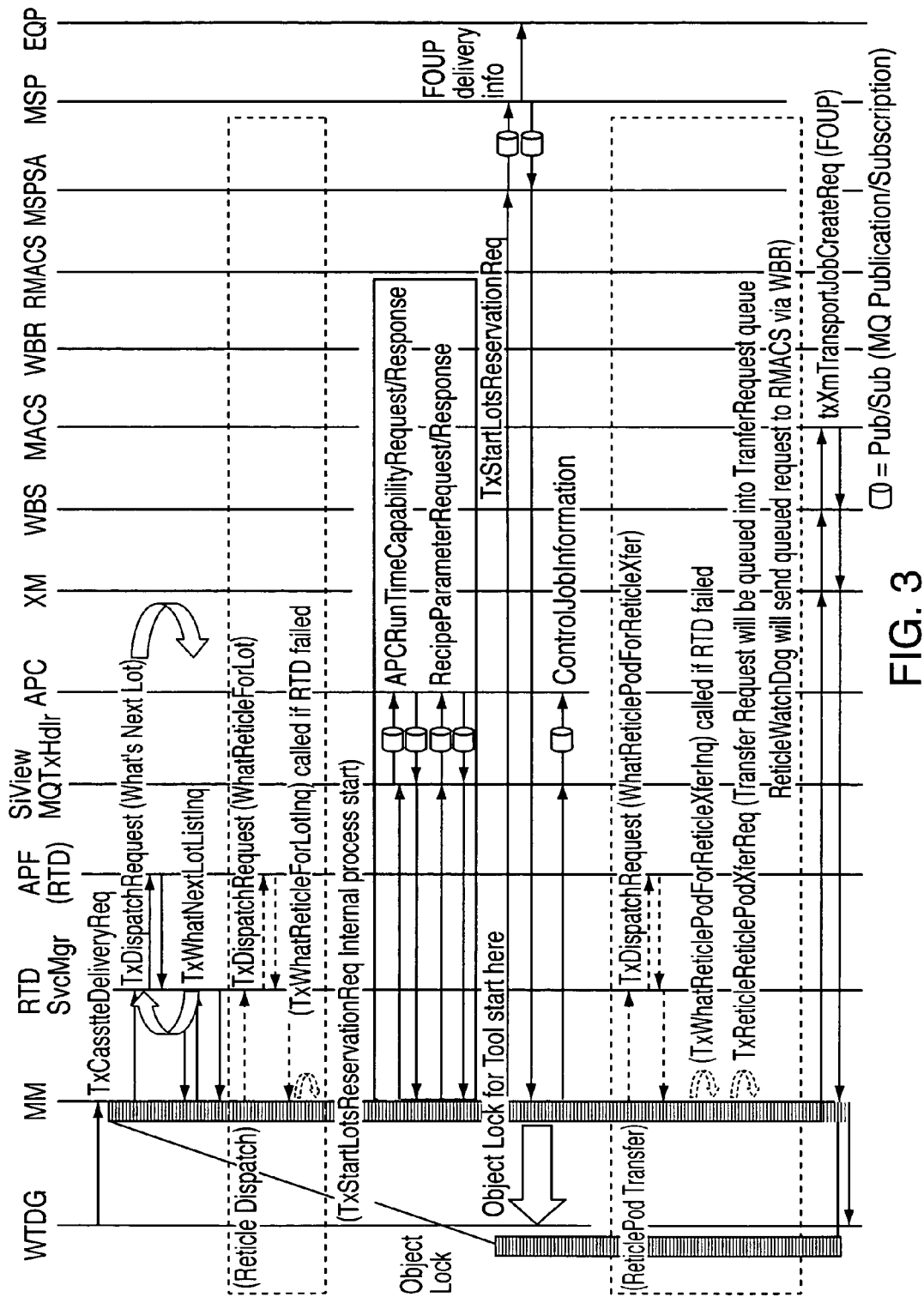
FIG. 3 is a communications flow diagram showing a representative transaction (TX) sequence for the SiView Standard MES fully automated auto-3 mode dispatching operations within the factory automation system of FIG. 2, in order to more fully explain the use, operation and benefits of the systems and methods of the present invention.
Figure 4:
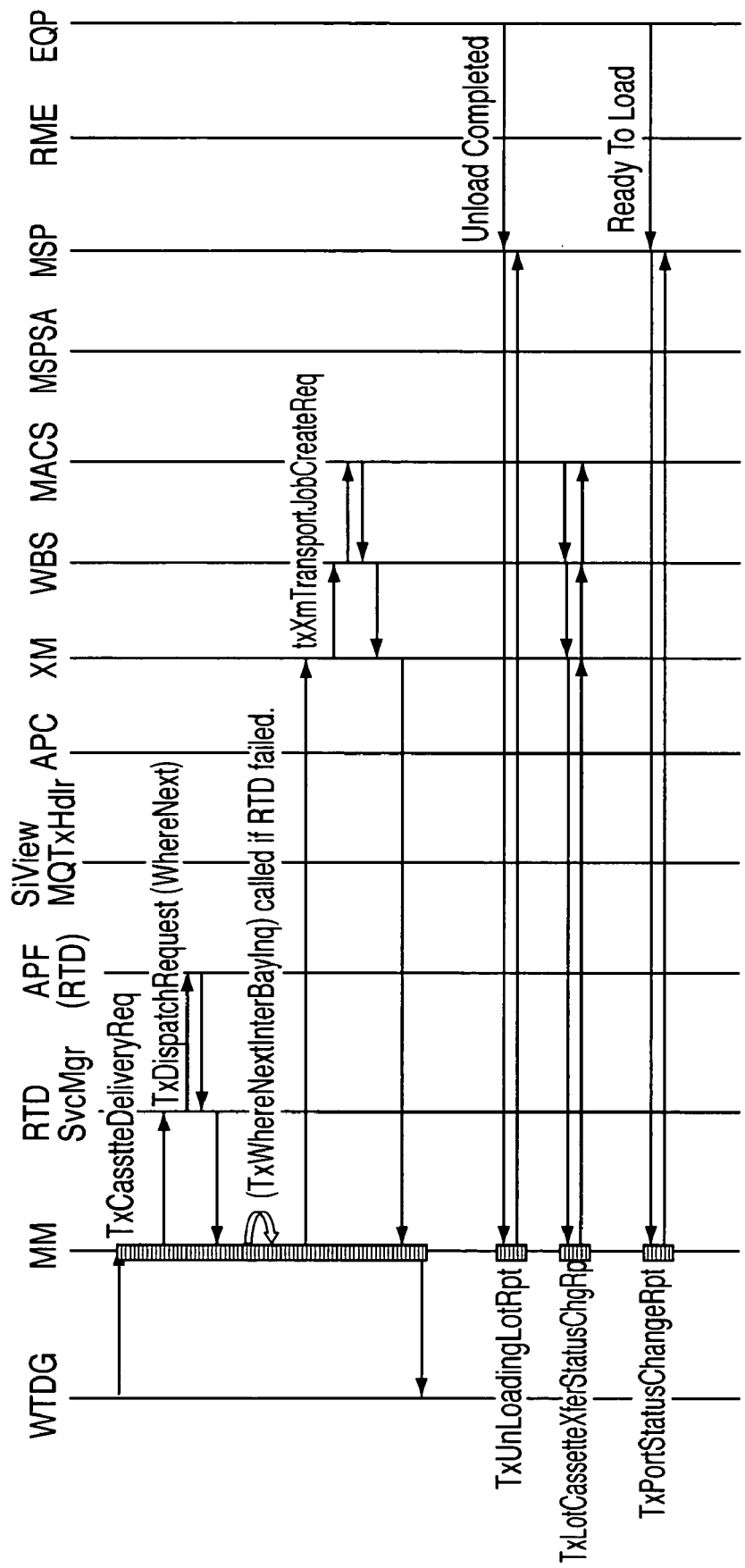
FIG. 4 is a communications flow diagram showing a representative TX sequence for the SiView Standard MES fully automated auto-3 mode unload operations within the factory automation system of FIG. 2, in order to more fully explain the use, operation and benefits of the systems and methods of the present invention.

Once the products are selected as being next to process, the MES will send a Delivery Request. In the case of the SiView MES, these requests are implemented through separate programs or logic components called "Watchdogs" (WTDGs) that are typically responsible for groups of equipment, and which monitor equipment status and availability. The pertinent watchdog sees that an equipment load port is available, and also sees that a Load Request pending and then, based on the RTD What's Next List, sends a Delivery Request to the MM. This sequence of events may be better understood with reference to FIG. 3, which is a communications flow diagram showing the transaction sequence of a Fully Automated Auto-3 Dispatching Operation in the FIG. 2 factory automation system.

Figure 5:
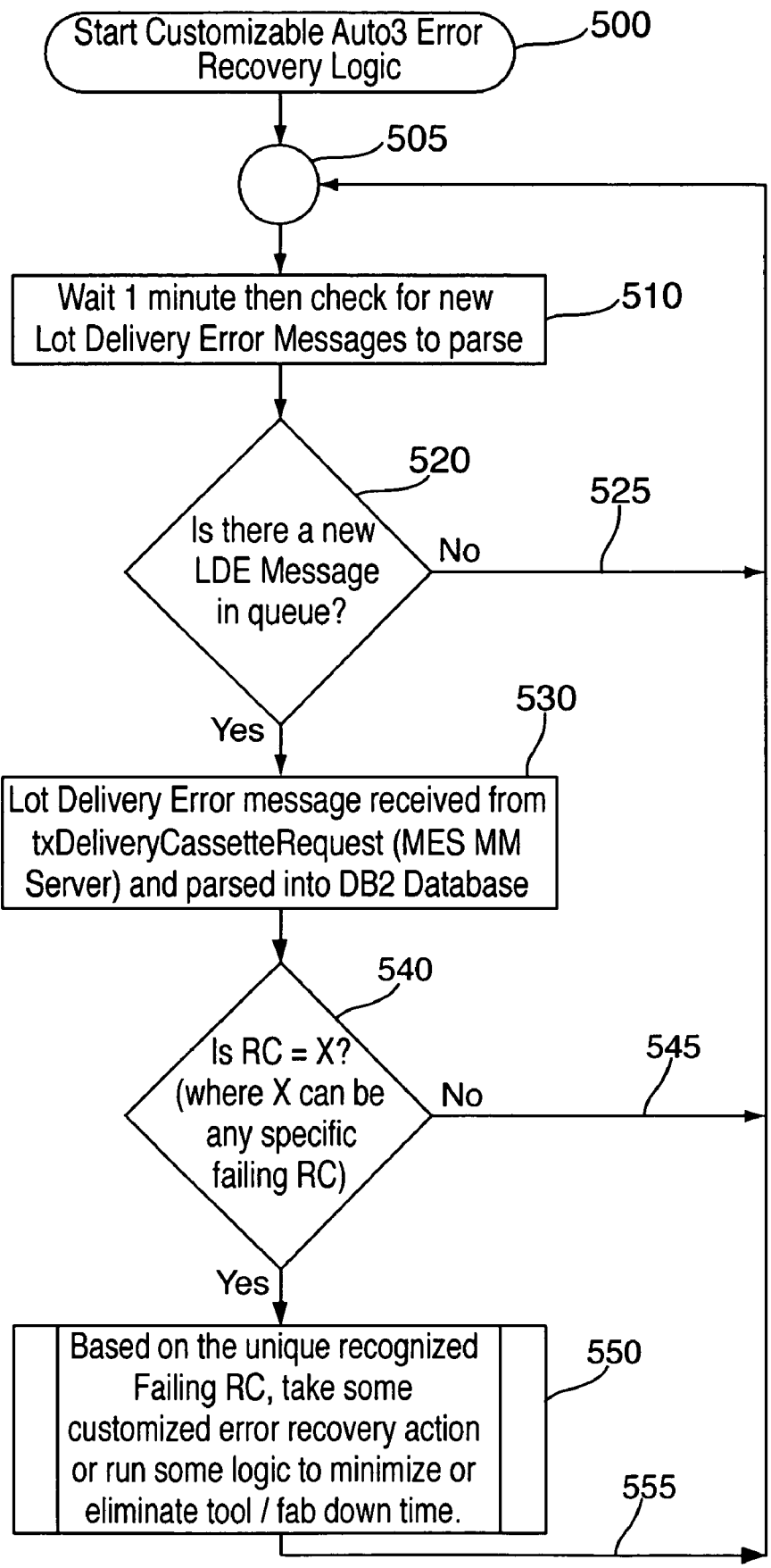
FIG. 5 is a flowchart showing one exemplary approach to implementing the error recovery methods of the present invention, which approach is suitable for use in the embodiments of FIG. 1 and/or FIG. 2, and which includes periodically checking for error messages, checking whether such each message is recognized as an error condition for which auto recovery is provided, and then taking some error recovery action.

When the WTDG logic sends the Delivery Request to MM, one or more bad return codes may possibly occur as further described below in Part 3 of this detailed description. This happens when for some reason the MES has encountered an error for this delivery request and the delivery cannot be completed as sent. At this time, since no transport commands have been sent yet to the MCS, the information about this error condition is conventionally still all contained within the MES, in that the RTD or scheduler/dispatcher still does not know there is a problem. In such an instance, when bad return codes are being received, for example if they should effectively indicate that the initial Delivery Request command has been interrupted, the issue resolution system 120 of the present invention goes to work. As will be further explained below, Customizable Fully Automated Error Recovery Logic, as shown in the flowchart of FIG. 5, may be implemented directly in the MES of FIG. 2, as explained in Technique No. 1 below, to handle and hopefully resolve the reported error condition(s). Or this Error Recovery Logic could be coded as an additional component, as explained in Technique No. 2 below.

In practice, there are not two but several practical techniques or ways to implement ISR systems and methods of the present invention with regard to a given error condition, problem or other issue, or with regard to one or more sets of error conditions, problems or other issues. The approaches disclosed herein are flexible, meaning that the ISR systems and methods of the present invention may be logically implemented in a factory automation system by using any one of five following techniques (i.e., approaches), as needed or desirable, to handle one or more sets of error conditions, problems or other issues:

Technique 1: The ISR system may be designed and implemented directly in the MES such as in the MM component thereof, so that it is part of the MM logic.

Technique 2: The ISR system may be implemented as a new subsystem, set of components or set of subcomponents of an MES. As such, it may be offered to customers as an optional system to purchase or lease.

Technique 3: The ISR system, at least in part, may be logically designed and coded in an existing subsystem or component of the MES such as the WBS or WBR. One such approach, described further in Part 5 below, is an example of the ISR system being implemented in the SiView WBS. This approach makes particular sense if the MES is modularized such as SiView normally is and if the Delivery Request command was successful but the txXMTransportJobCreateReq request (Either Dispatching/Loading or Unloading) fails between the MCS and MES. This approach allows some logic to be programmed between the WBS and MACS utilizing the HSMS protocol between the two programs. This also assumes that the MCS has some ability to receive commands from the WBS or MES to resolve some of the errors or bad return codes which are listed in Part 4 below.

Technique 4: The ISR system may be totally customized by each user to address the specific conditions that have been identified as susceptible to possible resolution in that user's factory automation system. For example, in the exemplary automated fab described herein, the Lot Delivery Errors received by the MM MES may be designed and programmed into Automated Error Recovery application, also called the ISRM subsystem herein, based on the error conditions and failing return codes as further described in Parts 3 and 4 below. Again, a general approach to processing the errors is represented in the flowchart of FIG. 5.

Technique 5: The ISR system may be implemented within the RTD, Dispatcher or Scheduler provided that the right data is being passed from the MES and MCS to the RTD, Dispatcher or Scheduler component of the MES.

Any one or more of these five techniques for implementing the ISR systems and methods of the present invention may be used in whole or in part in a single automated fab. For example, different types or sets of error conditions may be handled by separate ISR systems within the overall factory automation system. This approach allows the ISR systems to be modularized so that error conditions may be handled by a local ISR system dedicated to certain areas and types of stations, tools, equipment or control systems within the fab 30.

Part 3—Possible (SiView) MES Return Codes/Error Codes and Cross Reference Table

Every MES including the SiView Standard MES, has failing return codes, which are error condition codes that are designed and implemented as part of their overall logic, for reasons explained above. Listed below in Table 3 is an illustrative sample or subset of some of the possible return codes or error codes that can be possibly returned by the SiView Standard MES. This list is exemplary only and is not intended to include every possible return code nor is it limited to only those types of problems referred to in the descriptions. This list is provided to identify exemplary SiView Standard MES return codes that may be checked for and possibly handled and resolved in accordance with systems and methods of the present invention in the context of a SiView MES. In Table 3, [*], [], through [**] all refer to some specific value defined and filled in by the MES or the some other CIM system during runtime. Various acronyms or other abbreviations used in Table 3 are also defined in Table 2. Other abbreviations are rather self-evident (e.g., "eqp" means equipment; "ID" means identification; "Mgr" means manager; "Req" means request, etc.).

TABLE 3

Return Code/SiView Error Code Cross Reference Table

| Return Code | SiView Error Code & Brief Description |
|---|---|
| 904 | 000164E Status [Not Available] of cassette [****] is invalid. |
| 905 | 000165E The transfer status [] of cassette [**] is invalid, or carrier has another transport reservation. |
| 933 | 000185E Lot 03128Y27078.000 processStatus Processing is invalid for this request. |
| 958 | 000207E The reticle [**] transfer status [] is invalid for the request |
| 1547 | 000244E There was no response from XMS |
| 1425 | 000260E Category [DispatchFailCode] information has not been found |
| 1437 | 000272E B323__APCMgr__SendAPCRunTimeCapability |
| 1468 | 000297E Process operation information pdID for lot [****] has not been found please check basic record information. |
| 1488 | 000315E Reticle [****] information has not been found |
| 2037 | 000381E A System error has occurred |
| 2104 | 000385E There was no response from TCS |
| 946 | 000440E Specified Port I01 port state |
| 534 | 000485E Machine is not available now |
| 117 | 000499E Specified port IO2 port group is reserved for another process group B |
| 324 | 000500E (*) object locked |
| 532 | 000558E Specified lot 03248GU3252.000 cannot be processed in current machine state. |
| 979 | 000561E The Lot cannot be processed inhibit |
| 329 | 000594E Cassettes Control Job ID |
| 2830 | 000714E There was no response from RTD. RTD Server Manager may not be available |
| 2831 | 000715E RTD parameter Raw__eqp__id does not exist in the RTD Interface agreement parameter. |
| | 000716E RTD information has not been found |
| 1912 | 000718E RTD Interface-Switch is now OFF |
| 1913 | 000719E RTD timeover [1800] health check |
| 1917 | 000731E RTD Interface Route ID information has not been found |
| 2943 | 000739E ParameterValue came off the Limiter Range |
| 1920 | 000750E RTD subsystem returned some error. There are no active schedulers known to the Dispatch Server, or Error calling TxWhatNextLotListInq |
| 2848 | 000751E There was no response from APC. APC service Manager may not be available |
| 2948 | 000760E Equipment DS01 has been already IO1 reserved. |
| 623 | 000795E Logical Scrap wafers are found. Need wafer sorter action |
| 2109 | 000825E Binding to external server (TCS) has failed |
| 2501 | 000826E Binding to external server (XMS) has failed |
| 1923 | 000829E Binding to external Server (RTD) has failed |
| 2949 | 000841E Lots next operation requiring carrier category [FOUP-CU-PEI] and lots current carrier category [FOUP-NonCu-PEI] does not match. |
| 1243 | 000874E Carrier-Lot Combination had been changed after previous reporting |
| 4001 | 0004001E There was no response from AMHS01 |
| 4134 | 0004134E Transfer Requesting Carrier count and Accepted Carrier Transferring count does not match |
| 4051 | 0004051E Transfer Job Pending |
| 4191 | 0004191E The system error has occurred |

TABLE 3-continued

Return Code/SiView Error Code Cross Reference Table

| Return Code | SiView Error Code & Brief Description |
| --- | --- |
| 10113 | 0010113E APC runtime capability error |
| 10501 | 0010501E MM cannot bind to MQWrapper |
| 11906 | 0011906E: Equipment [****] reticle pod port [any port] does not found |
| 11925 | 0011925E: There are no automatic available reticle pod port of machine [****] |
| 5408 | SiView MSP Adapter Dispatch Error |

Part 4—MACS ACK RC Cross Reference Table

Every MCS (Material Control System) including the MACS (Murata Automation Control System) MCS has failing return codes or error codes designed and implemented as part of their overall logic. In a fully automated fab, such as the fab using the FIG. 2 factory automation system, the MACS MCS is sent transport delivery and pickup commands (load, unload, transfer requests, reroute, etc.) from the MES or some subcomponent of the MES such as the SiView WBS and WBR. These commands will be acknowledged by the MCS with either a good or successful return code, or a failing return code which indicates an error condition or other problem of some sort. Listed below in Table 4 is a sample or a subset of some of the possible return codes or error codes that can be possibly returned by the MACS to the SiView MES. This list is not intended to include every return code nor should the issue resolution systems and methods of the present invention be considered as being limited to only these types of descriptions. Rather, Table 4 is only intended to identify some of the known MACS return codes that may be checked for and possibly handled and resolved through the implementation of an issue resolution system and related methods of the present invention within the FIG. 2 SiView MES.

TABLE 4

MACS Return Code Cross Reference Table

| Return Code | SiView Error Code & Description |
| --- | --- |
| −316 | Reject, The Carrier job is canceling. |
| −315 | Reject, The Carrier job is rerouting. |
| −314 | Reject, State of the carrier job does not allow the attribute change. |
| −311 | Reject, The Carrier job has no relation with the transfer job. |
| −310 | Reject, The Carrier belongs another owner. |
| −309 | Reject, ExpStopTime violation. |
| −308 | Reject, ExpStartTime violation. |
| −307 | Reject, Route from current location to new destination is not available. |
| −306 | Reject, New destination is not available. |
| −305 | Reject, New destination is full. |
| −304 | Reject, Unknown destination location. |
| −303 | Reject, Unknown Carrier ID. |
| −302 | Reject, Unknown TransferJobID. |
| −301 | Reject, Unknown CarrierJobID. |
| −215 | Reject, The carrier is in unknown state. |
| −214 | Reject, Pickup procedure for former job at the equipment port is not yet completed. |
| −213 | Reject, Batch transfer, at least one request has been rejected. |
| −212 | Reject, The carrier belongs another owner. |
| −211 | Reject, ExpStopTime violation. |
| −210 | Reject, ExpStartTime violation. |
| −209 | Reject, Route from source to destination is not available. |
| −208 | Reject, Destination is not available. |
| −207 | Reject, Source is not available. |
| −206 | Reject, Destination is full. |
| −205 | Reject, Unknown destination location. |
| −204 | Reject, Unknown source location. |
| −203 | Reject, The CarrierID already exists in other location. |
| −202 | Reject, Unknown CarrierID. |
| −201 | Reject, Duplicated TRJOBID. |
| −302 | MACS Reroute request from an S64F3, this is a duplicate request sent to MACS. |

Part 5—Auto Error Recovery Example Using WBS

The following is an example of one possible external design approach being used to implement an issue resolution system for the SiView Standard WBS Component to automate the checking for, handling and recovery from an Unknown Carrier State Response. Its function and purpose will first be summarized, and the details thereof will then be examined more closely.

XM (the SiView Standard Transaction Manager) transmits a transport job request, TxTransportJobCreateReq, to WBS (Within Bay System) which then sends the message to MACS as HSMS/SECS S64F1. During certain error conditions (further explained below), MACS will return to WBS a TJRACK (Transport Job Request Acknowledgment) other than zero. The purpose of this request is for WBS to react specifically to the TJRACK of −215, which corresponds to "Reject, The carrier is in unknown state" as noted in Table 4 above, and respond with an S64F21, Carrier ID Validation Report.

Detailed Function Description. TJRACK of −215 is a MACS error code which states that the carrier to which the transport job request was directed is at an unknown state which prevents MACS from executing the transport job create request. The carrier enters the unknown state when either of the conditions is met:

1) When the carrier ID read does not match the carrier ID that MACS expected.
2) When SiView responds to a carrier ID validation request (S64F20) with a non-zero CVALIDFLAG or WBS fails to send S64F20 to MACS.

Exemplary situations which may cause the just-noted error conditions that in turn cause the carrier to enter an unknown state are:

a) MACS overhead transport (OHT) expects to pick up the carriers from a tool in a given order. However, the tool unloads the carriers in a different order. In turn, when the carrier ID is read in the stocker input port, MACS discovers that the carrier ID it expected on the carrier is not the same as the actual carrier ID read off that carrier.

b) A user (e.g., a service technician) removes a carrier from a tool before the tool reports a job completion report to SiView. That user then places the carrier on the manual stocker input port. When MACS request for a carrier ID validation request (S64F19), SiView will respond to MACS with a non-zero CVALIDFLAG because SiView expected the carrier to be on a tool and not on the manual stocker input port. Or, WBS does not receive or respond to the MACS carrier validation ID request, S64F19.

When the above conditions are met, a conventional recovery requires the user to "release" the carrier from the unknown state by manually entering an appropriate set of commands using the MACS graphical user interface (GUI). With the system of the present invention, the solution automatically generates the "release" command after WBS receives the TJRACK of −215 by using the MACS S64F21.

Detailed Function Logic. XM will send WBS' FOManager (Factory Operation Manager) a transport job create request. Beyond the standard specification of the FOManager's TxTransportJobCreateReq function, that function according to the present invention is "overloaded" with an additional logic. The logic for TxTransportJobCreateReq is redesigned to listen for and respond to the TJRACK −215 error. Upon the receipt of a TJRACK −215, FOManager TxTransportJobCreateReq sends an S64F21 to MACS SiView Primary port. TxTransportJobCreateReq then waits for the S64F22 response. After receiving the response from MACS, TxTransportJobCreateReq will then complete its function and return to SiView the original TJRACK −215 and the return code of the S64F22 acknowledgment, CVRACK. (See Table 6 below, the Operation Flow section, which shows the logic sequence of this error recovery operation.)

TABLE 5

Function Conditions Table

| Check Item | Value (should be) |
|---|---|
| SiView carrier state | Carrier state on SiView is available and known. |
| SiView transport carrier job | The transport job does not have an existing transport job—i.e., the transport job is not a reroute request. |
| MACS carrier state | Carrier state on MACS is an unknown state |
| MACS carrier ID | Carrier ID is known to MACS—i.e., this is not an unknown carrier ID error |
| MACS carrier location | The carrier is within the control of MACS—i.e., the carrier is not physically out of MACS system. |

Automation Support. The reaction to the TJRACK −215 is thus fully automated. No new interface is required from XM or MACS.

TABLE 6

Operation Flow Table

| SiView XM | ORB | WBS | HSMS | MACS |
|---|---|---|---|---|
| TxTransportJob CreateReq | | | | |
| | → | Call TxTransportJobCreateReq | | |
| | | Send S64F1 | → | MACS processes the transport job create request. |
| | | Receive S64F2 | ← | If MACS can process job, MACS returns with TJRACK = 0. If the carrier is at an unknown state, MACS returns with TJRACK = −215. Else, MACS returns the TJRACK error code. |
| | | If (TJRACK == −215) { | | |
| | | Send S64F21 | → | MACS will "Release" the carrier |
| | | Receive S64F22 | ← | And then respond back with CVRACK = x |
| | | WBS Return message: | | |
| | | TJRACK = −215 and | | |
| | | CVRACK = x | | |
| | | } | | |
| | | Return response | | |
| | | } | | |

As noted in the foregoing sequence, if a −215 error is received, the logic outlined above responds to it by generating an automatic release command.

The flowchart of FIG. 5 shows one approach to implementing the error recovery methods of the present invention, as part of a larger control system. The approach begins at oval 500, when the issue resolution (ISR) software is turned on or enabled. This may be arranged to occur when the rest of the MES or MAC is put in the Full Auto3 mode. As indicated at box 510, a repeating timer is started when the ISR software system is turned on. The timer can be set to any suitable period, such as 5, 10, 15, 20, 30, 45, 60 or 90 seconds, or two or more minutes. For purposes of discussion, assume that this repeating timer is set at one minute, and that this particular part of the ISR software is set up to handle Lot Delivery Error (LDE) messages. At the end of one minute (or other suitable period of time specified in the timer), the ISR software checks whether there is a new LDE error condition message in a queue. The queue may be implemented in any suitable fashion such as a first-in first-out (FIFO) stack, which may be part of an input buffer associated with the ISR system, or stored within a separate memory location in the ISR System.

As shown by decision diamond 520, if there is no new LDE message, the control loops back through "No" path 525 to connector 505, where the repeating timer makes the software wait for another minute, before it checks again for a new LDE message. If there is such an error condition message, for example, one received from the MES MM server, then it may be analyzed to determine from where it came, if desired. The message may also be parsed, so that the error condition data it contains or represents, can be used by the ISR software and/or stored in a suitable database, such as a DB2 database, for record-keeping and/or possible future analysis along with other similar data. Assume for sake of discussion, that this new Lot Delivery Error message was received as result of a TxDeliveryCassetteRequest, and that there is a certain failing return code (RC) associated with the message.

Decision diamond 540 indicates that the next step is to determine if this particular failing return code is one of the codes recognized by the issue resolution software. If it is not, then the ISR software passes control to path 545, which then loops back to connector circle 505, where the software waits again for another minute at block 510. If the failing return code is recognized, then control passes to block 550, where the ISR system takes some customized error recovery action or follows through with a sequence of logic associated with that specific failing return code. This action or sequence may be one or more series of actions or corrective commands. It may also be a few courses of corrective commands or actions which may be taken in an effort to automatically recover from or at least automatically reset that error condition, in order to minimize or eliminate tool or fab downtime. After these actions or corrective commands are complete, the ISR system program flow follows path 555 back to circle 505, where the timer of block 510 is activated for another minute.

In the case of a Lot Delivery Error message, common recovery or resolution actions may include but are not limited to:

1) Put the Failing Lot on hold automatically, or
2) Make the failing FOUP unavailable automatically, and/or
3) Page and/or email appropriate fab operators or other support personnel for manual intervention.

By putting the Lot on hold automatically, or by making the FOUP/Carrier unavailable automatically, and by preferably communicating that action or step or other result to those parts of the fab that are affected by or need to know about this change of status, such as the RTD or dispatching logic, the other control software in the fab will know to (and can be coded to) bypass these objects that caused (or are associated with) the failing return code. In this manner, the MES can go to the next lot in the What's Next List for Auto dispatch, and continue with fully automatic operations. FIG. 5 represents one instance of an ISR system running, however, the ISR system may be designed to enable many instances of the FIG. 5 program control to be running at once, as will be further described below. In this manner, those skilled in the art should appreciate the ISR system of the present invention is able to handle numerous different reported error conditions, problems and other issues substantially simultaneously.

Figure 6:
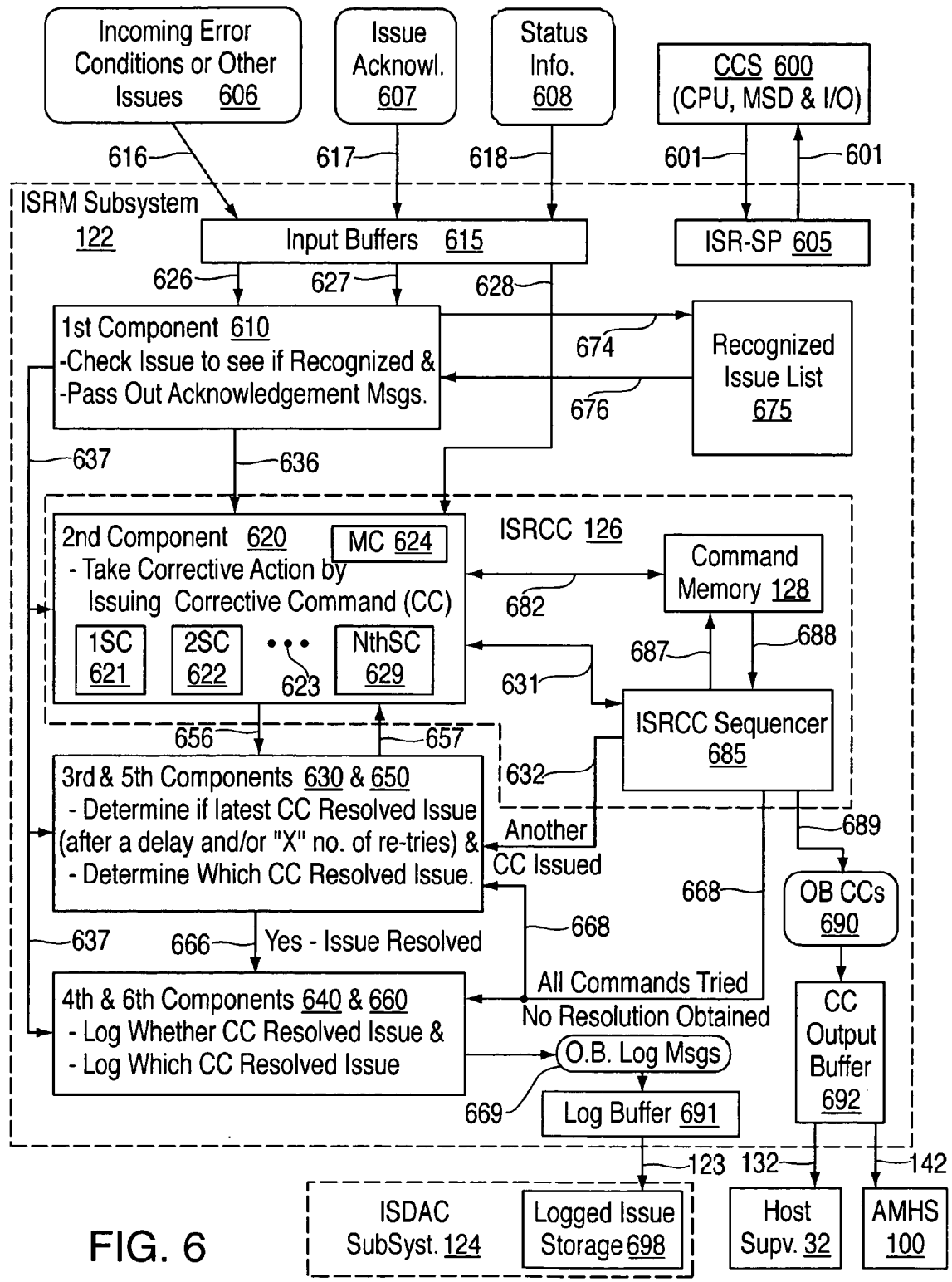
FIG. 6 is a more detailed block diagram showing an exemplary arrangement of various components with the overall issue resolution system of the present invention, which arrangement is suitable for use in the embodiments of FIG. 1 and/or FIG. 2.

FIG. 6 represents one of a variety of different possible techniques that may be used to implement an issue resolution (ISR) system 120 of the present invention, shown in FIG. 1. The FIG. 6 arrangement of hardware and software components is consistent with and may be used to implement the generalized approach to issue resolution solutions presented in the flowchart of FIG. 5. As previously mentioned in connection with FIG. 1, ISR system 120 may include an issue resolution management (ISRM) subsystem 122 and an issue database and collection (ISDAC) subsystem 124, both of which may be generally interconnected as needed to the rest of the factory automation system 30. Exemplary interconnections within and between the ISR system 120 and its subsystems and the rest of fab automation system 30 are shown in FIG. 1. FIG. 6 is directed toward explaining an exemplary detailed embodiment of the ISRM system 122 including an arrangement of components therein, and how they operate and interact with one another.

As shown in both FIGS. 1 and 6, the ISRM system 122 may include an issue resolution command center (ISRCC) 126 and an optional command memory component 128. As shown in FIG. 6, component 128 may be a part of the ISRCC 126 if desired. As described in connection with FIG. 1, the issue resolution system 120 may include an ISDAC subsystem 124 that receives and collects information regarding error conditions, problems and control status from AMHS 100 directly over communication paths 129 or indirectly through information passed over other paths, described in FIG. 1, that provide status and error condition information to and from the host system 32, the production equipment control (PEC) subsystem 34, and the manufacturing execution system (MES) 36. At the top of FIG. 6, this information is shown being brought to the ISRM subsystem 122 at blocks 606, 607 and 608. Block 606 represents incoming messages about error conditions, problem reports or other issues requiring attention, which come in on communications path 616. Block 607 represents error condition acknowledgments or other error condition related messages passed along path 617, which may arrive as the ISR system 120 is attempting to resolve one or more reported error conditions, problems or other issues. Block 608 represents system and equipment status messages received from the other control systems in the IC fab 30, including host 32, the MES subsystem 34, and the PEC subsystem 36. These status messages are shown coming into the ISR system 120 along a suitable communications path 618.

FIG. 6 shows the issue resolution management (ISRM) system 122 within the large dashed box in order to represent that system 122 may be set up as an independent subsystem which can be run as a separate application on any suitable computer system within the automated fab 30. The necessary computer hardware is represented by computer control system (CCS) 600, which has one or more central processing units (CPUs) with their own internal ROM and RAM memory, one or more suitable mass storage devices (MSDs), and suitable input/output (I/O) devices for communicating with the other parts of fab 30. As shown in the upper right hand corner of FIG. 6, ISRM subsystem 122 optionally includes an issue resolution supervisor (ISR) program (SP) 605, which preferably coordinates the operation of the overall system 122. System 600 also includes one or more suitable input buffers 615 for receiving and temporarily holding incoming signals or messages on paths 616, 617 and 618, and one or more output buffers 691 and 692 shown in the lower right hand corner of FIG. 6. Log buffer 692 receives outbound log messages (OB Log Msgs) 669 to be sent along to issue storage 698, which may be part of the ISDAC subsystem 124. Storage 698 may be provided one or more local files or databases on computer system 600 or may be files or databases on remote storage devices located on another computer system.

FIG. 6, in the lower right hand corner, indicates that one or more outbound (OB) automated corrective command (CC) messages 690 are sent out from the issue resolution command center (ISRCC) 126, shown in the medium-size dashed box in the center of FIG. 6, across a suitable communications path 689 to output buffer 692. Then, after appropriate conversion into messages in a suitable communications protocol (such as CORBA or MQSeries) and at a suitable time these corrective command messages are across the appropriate communications paths, exemplified by paths 132 and 142, to the part of the automated fab, such as host supervisor 32 or automated material handling system (AMHS) 100, for which they are intended.

ISRM subsystem 122 may also include up to six major software components which may have one or more subcomponents and other lists, parts or subcomponents as well, such as recognized issue list 675 and other parts that will be described shortly. The six major components are first component 610, second component 620, third component 630, fourth component 640, fifth component 650, and sixth component 660, which may be generally interconnected, from a signal flow point of view, as shown. Incoming error conditions (EC) messages 606 are received and temporarily stored in input buffers 615, where supervisory program 605 causes them to be parsed and/or translated if needed, and then such EC messages, which typically may be failing return codes, are sent to first component 610, which checks to see if the EC or failing return code is recognized. This is done, as suggested by path 674, by checking EC or failing return code or other issue code received against a recognized issue list, which may be maintained in a separate file or module 675. By "recognized issue" is presently meant a failing return code or other coded message for which the ISRM system has been pre-programmed to provide one or more corrective commands and/or other "issue resolution" actions that may automatically solve the problem and/or at least automatically handle the issue, so that the rest of the automated fab may continue with its production, preferably without having to immediately involve a human being. A suitable reply is sent along signal path 676 to indicate whether the incoming failing return code has been recognized as being on the list 675 or not. Thereafter, first component 610 informs ISR-SP 605 and/or the other modules 620, 630, 640, 650 and/or 660 as needed along path 637 as to whether the incoming error condition has been recognized.

If the error condition is recognized, then on path 636 a signal is sent to second component 620, which is part of the issue resolution command center 126. Depending upon how extensive second component 620 is, it may have its own master control (MC) program 624, and it may have two or more subcomponents, as indicated by first subcomponent 621, second subcomponent 622, the ellipses 623, and the Nth subcomponent 629. In practice, N may be as high of a number as needed to handle the different ECs, such as failing return codes for which the ISR system has been programmed to handle. It is contemplated that over time, the technicians and engineers in charge of operating the fab facility will devise, where practical to do, automated responses to reported error conditions (ECs), problems or other issues, especially as they gain an understanding of what kinds of automated responses are prudent to invoke upon the occurrence of any given EC, problem or other issue. Thus, although simple ISR systems may be designed and implemented with dedicated lines of codes written to handle just a few reported error condition codes or even a few dozen reported error condition codes, it may be beneficial, especially where the size of the ISR system of the present invention is expected to grow, to include more refined software structures within the second component and even other components to make the ISR system. Such refinements as shown and described in connection with FIGS. 6 and 7. Over time, it is expected that several dozens, to several hundred, and potentially even a few thousand return codes or more may eventually be added to one or more recognized issue lists 675 and thereafter processed by one or more issue resolution systems 120 with a large automated fab.

In this regard, second component 620 may if desired have a separate command memory 128 and an issue resolution command center (ISRCC) sequencer 685. Memory 128 is accessed over path 682 to reference one or more stored courses of automated commands or automated commanded actions. These typically will have been written and tested earlier by fab support personnel, upon recognition that a particular reported error condition (EC), problem or other issue is a good candidate for possible automated resolution. The stored lists of command and/or desired actions for each such course may be provided in sequence as needed from memory 128 to sequencer 685 over communication paths 687 and 688. Sometimes a course may consist of a single command or single action to be tried, but often there will be two or more steps to be tried within a given course of commands or actions. If the first course fails to produce the desired result (e.g., the correcting, curing, rectifying or otherwise resolving of the reported error condition) then if available a second course of automated corrective commands or commanded actions, also stored in memory 128, will normally be tried. If those also fail to produce the desired result, then if available a third course of commands or corrective actions, also stored in memory 128, may be tried, and so on, until the desired result (i.e., resolution) is produced or until all available courses of commands or actions in memory 128 that are to be tried on an automatic basis to resolve this particular reported EC or issue have been exhausted.

For certain error conditions, problems or other issues, one possible automated corrective action is to issue a command that causes the appropriate attending personnel (typically an operator or service technician on duty or an engineer on call), to be automatically sent to an instant message by any suitable means. Such means may include pager, cell phone or other suitable portable wireless communicating device, such as a wireless-enabled personal digital assistant like a PalmPilot or a Blackberry. The message may be sent as a short text message, a coded text message, as a synthetically-generated voice message, an e-mail message, or any other suitable way of communicating. This kind of message may if desired be the last or one of the last automated commands or actions specified in sequence of corrective steps to be taken. Most often, such a message will be used when all other specified automated commands or actions have been tried without success.

Alternatively, even if a FOUP, tool or station is successfully taken off line or otherwise dealt with automatically by the automated ISR system, it still may be desirable in some instances to alert attending personnel about the problem and the corrective action taken. In this manner, appropriate follow-up or other remedial action can be scheduled.

As noted in the summary above, ISRM system 122 may not always be able to respond to a reported error condition or other issue. System 122, through available status information, may recognize that certain system or equipment states exist which preclude generating a corrective response, and it may be useful to general a message to this effect. One way to implement this functionality is for second component 620 of ISRM system 122 to include: a first subcomponent 621 for determining whether an automated corrective action is able to be taken at present, and a second subcomponent 622, in communication with the first subcomponent, for advising another control system that an automated corrective action cannot be executed at present. If desired, second subcomponent 622 may be operatively arranged for advising via a first message that an automated corrective action cannot be taken because of a condition specifically identified in the first message, such as, for example, at least one piece of equipment or other automation identified in the second message not being in a required automatic mode. The automation may be a tool, a station, a transport device, a control system, a communications device, link or system, or a supervisory system, for example. This situation can occur, for example, when a support person or any other cause has taken the piece of equipment or other automation in question out of automatic mode. Accordingly, the ISRM system 122 may, if desired, put the corrective action on hold, until the piece of equipment or other automation that is off line is returned to the required automatic mode. This functionality may be written into the controlling logic of master control (MC) 624 of second component 622. When through status information messages provided on path 628, MC 624 sees that the condition causing the corrective action to be put on hold has been cleared, then MC 624 may if desired (i.e., so programmed) re-activate the generation of suitable corrective commands in an attempt to clear the still unresolved error condition.

Further, the ISR system of the present invention may also automatically send, when appropriate, its own reporting messages, as part of its preplanned response to various reported error conditions or other issues to one or more control systems outside of the ISR system. One such reporting message is whether or not the error condition has been successfully resolved. Other reporting messages may address the status of the issue resolution effort. For example, with respect to a given reported error condition, such status messages may include:

(1) "EC Not Recognized—No Automated ISR Response is Available" (meaning, none has been programmed into the SR system yet for this reported EC);

(2) "Issue Recognized; Awaiting Clearance" (meaning the ISR system recognized the reported EC or failing RC but some other condition is preventing the automated ISR response from being carried out, like some system or piece of equipment not being in full auto mode);

(3) "Automated ISR Response in Progress" (meaning the ISR system is working on a resolution of the recognized EC);

(4) "Automated ISR Completed with Success" (meaning the EC was cleared or otherwise resolved by the ISR system);

(5) "Automated ISR Completed without Success" (meaning the EC was not resolved, even though the ISR system went through its pre-programmed sequences of automated corrective commands and/or actions for this particular EC).

Each of these reporting messages may be sent out as needed or desired. In this regard, a reporting message may be automatically sent by the ISR system to the MES, PEC or other control system or computer within the fab that a particular item e.g., control system, FOUP, tool, station or other piece of equipment) is down and/or has been taken off line by the ISR system. The message may optionally indicate if desired that service or other follow-up action is required by attending personnel, and/or that the affected item should be put on the schedule of planned of maintenance activities. This automatically generated message may include preprogrammed information therein to indicate the perceived level of priority of this particular situation. Such messages from the ISR system may also be sent as desired over wireless communications systems to the appropriate support personnel. Various details of how to implement a wireless messaging system in an automated factory environment are described in a commonly-assigned pending application by Fukazawa and others (including two inventors named herein), which is now patent application publication No. US 2002/019864 published Dec. 26, 2002 and entitled "Method and System for Wireless Remote Monitoring and Control of a Manufacturing Execution System," the disclosure of which is hereby incorporated by reference herein. Various components shown in FIG. 6 (or subcomponents of such components) may be assigned one or more of these messaging tasks described herein.

Figure 7:
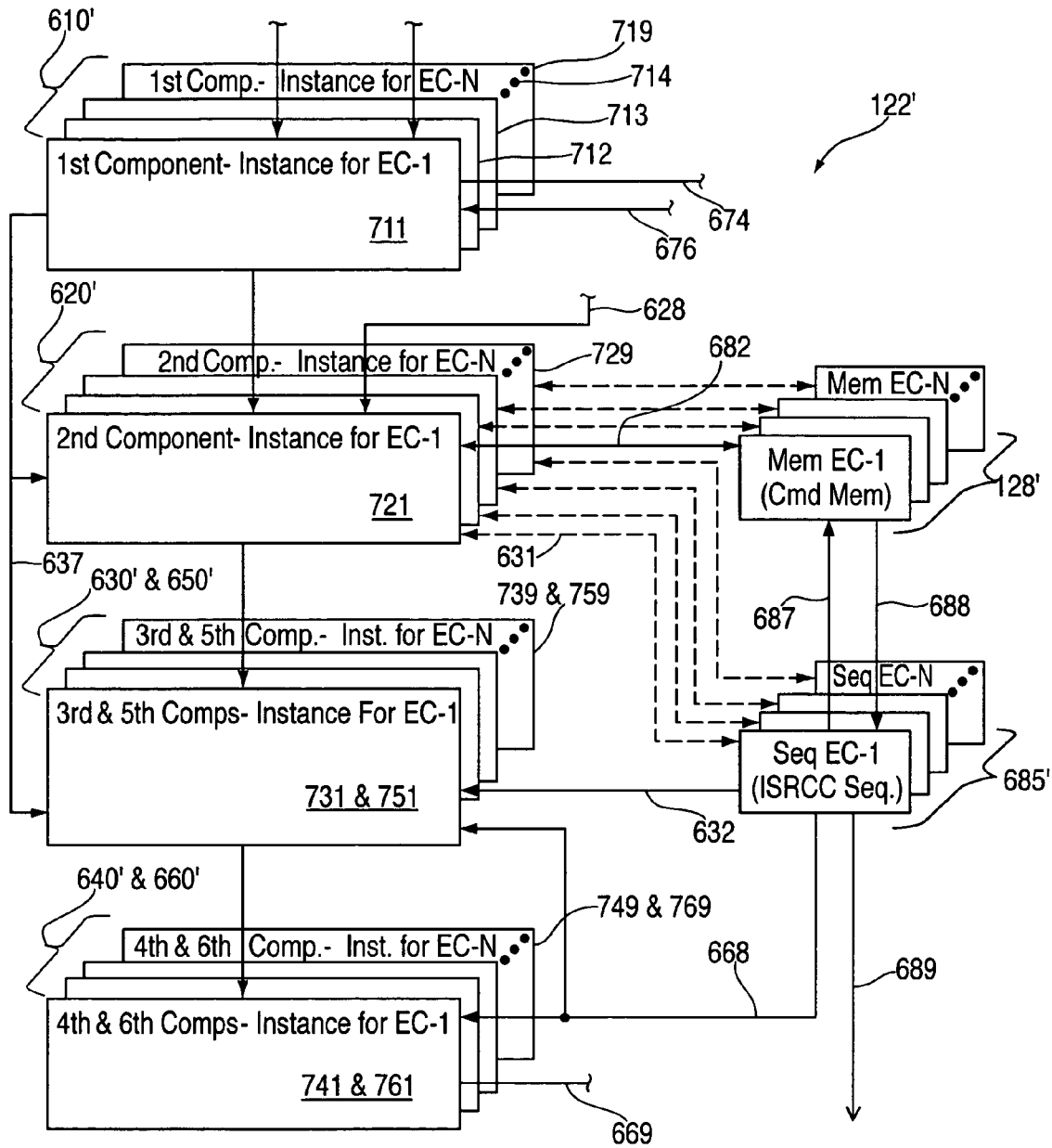
FIG. 7 is a variation of the ISR system shown in FIG. 6, illustrating that various components within the FIG. 6 embodiment may be provided a multiple number of times, with each instance of the same being dedicated to a distinct recognized incoming error condition.

If desired, multiple second components (or multiple instances thereof) may be provided in ISRM system 122, one for each unique reported EC (such as a unique failing return code) or other reported issue, as will be further described in FIG. 7. As shown in FIG. 6, ISRCC 126, which includes second component 122, may include a variety of subcomponents. One such subcomponent, represented by ellipses 623, may be for providing at least first and second courses of possible corrective action, while another such subcomponent, which may be subcomponent 629, may be arranged for commanding the taking of the first course of possible corrective action, and then the taking of the second possible course of corrective action if needed, and then the taking of a third course of corrective action if needed, and so on. Each such course of corrective action may involve one or more steps or actions, and these steps or actions in a particular course of action may be carried out in whatever temporal format is needed, such as but not limited to on a timed basis, or in a certain sequence, or in a substantially parallel fashion, etc. These subcomponents 623 and 629 may be arranged to access stored information within command memory 128, and to employ the services of sequencer 685 in issuing outbound corrective commands 690. The job of sequencer 685 is to execute each preplanned sequence in its specified temporal format, which preferably is stored in suitable coded fashion in the entries for each recognized EC in command memory 128. If the first command or action issued does not result in the desired issue-resolving result, then second component 620 issues an internal command over signal path 631 to sequencer 685 so that the sequencer will proceed to issue the next automated command or action at the appropriate time.

In practice, as noted above, some error recovery situations may involve performing two, three, four or more possible corrective steps or courses of action, often in a certain sequence. At times, the error condition may be resolved before the end of the sequence of steps is reached. In this context, third component 630 may be arranged to determine if the latest issued automated corrective command or latest issued course of automated corrective commands or action resolved the reported error condition or issue. Second component 620 via path 656 tells third component 630 of its own status and via path 632 tells component 630 that it has issued another corrective command. The third through sixth components 630, 640, 650 and 660 all may be provided with information regarding the effect of issued automated corrective commands or actions via messages provided on paths 617 and 618 to input buffers 615. Such information may include, for example: control system status; tool, station and/or equipment status; messages returned in response to corrective commands or actions from host supervisor 32, MES 34, PEC 36 and/or AMHS 100; etc. The information in such messages may be distributed across communications path 627 to the first component 610, which then passes the information along as needed over path 637 to the second through sixth components. In this manner, the second through sixth components are provided with information they may need to provide the functionality stated herein with regard to each such component.

Third component 630 may include its own first subcomponent for providing a first message via path 657 indicating whether the automated corrective action appears to have resolved the error condition or other issue. By receiving this message from third component 630, second component 620 determines if it still needs to issue another corrective command or action or to be taking the next preplanned course of automatic corrective commands or action. If desired, a time delay may be provided in third component 630 in order to give the external control systems, tools, stations or other equipment which have received the automated corrective commands sufficient time to work so as to clear the error condition or other issue, and to report back to the ISRM system via one or more acknowledgment messages 607 and status messages 608, so that whether or not the desired result has been achieved can be determined. If desired, path 632 may be provided between the sequencer 685 of ISRCC 126 to third and fifth components 630 and 650 to indicate when another automated corrective command has been issued, and to specify the maximum amount of time the third and fifth components should wait before taking their next steps. Sequencer 685 will know when all automated corrective commands associated with the particular EC being addressed have been tried, and/or that there are no more commands to be tried. When this occurs, sequencer 685 generates a message to indicate this that is sent along on path 668 to components 630 through 660. In this manner, components 630 through 660 will know without any significant delay that there are no further corrective commands or actions to be taken with regard to the recognized EC presently being addressed by the second component 620.

A fifth component 650 may be provided if desired to determine which specific automated corrective action or command appears to have resolved the reported EC or failing RC presently being addressed by second component 620. Fifth component 650 may do this simply by noting which automated corrective command or action was last issued in conjunction with the reported EC or other issue being addressed by component 620, and then make the assumption that this last command or action resolved this recognized EC. Alternatively, fifth component 650 may be set to analyze the acknowledgment and status data provided via path 637 and use that data as well as the last issued command or action to make its determination. In either event, component 658 may also include a subcomponent which sends out a message reporting the findings or determinations of the fifth component, and such message may be transmitted via path 666 to the fourth and sixth components 640 and 660.

Like third component 630, fifth component 650 may perform the foregoing functions after a suitable time delay, or after so many tries or repeats of the same course of action by second component 620. Or fifth component 650 may simply wait until third component 630 has made its determination before fifth component 650 begins to perform its functions of determining which the corrective command or action or which course of corrective commands or actions appear to have resolved the reported error condition or other issue being addressed. Given that the functions of the third and fifth components are highly related, these may components be arranged as a single combined component if desired.

Fourth component 640 is the part of the ISRM subsystem 122 which logs whether the corrective command sequence resolved the reported error condition or other issue. A sixth component 660 may be provided, if desired, to log which particular automated corrective command or action appears to have resolved the reported error condition or other issue. Components 640 and 660 provide outbound log messages (O.B. Log Msgs) via path 669 to log buffer 691, where they are sent from time to time to logged issue storage 698 as previously described. Although not shown, those skilled in the art should appreciate that such outbound messages from the fourth and sixth components may be also sent by buffer 691 to host supervisor 32, to automated material handling system 100, or to still other systems as needed or desired. In practice, the command memory 128 may be optionally loaded with data for each listed entry which specifies the other control systems within the fab 30 that are to receive the outbound messages from the first, second, fourth and/or sixth components.

Those skilled in the art should appreciate that any given functionality within any given component of ISRM subsystem 122 may be implemented as a subcomponent if desired. The subcomponents within any of the components 610 through 660 may be represented by subcomponent boxes like those shown in second component 620. However, due to space limitations and to avoid drawing clutter in FIG. 6, those subcomponent boxes have been not shown but should be understood to exist therein.

Those skilled in the art should also appreciate that the third, fourth, fifth and sixth components may be integrated into one combined component if desired. Alternatively, if desired the third and fourth components may be integrated into one combined component, and the fifth and sixth components may be integrated into another combined component. Also, if desired, first and second components 610 and 620 if desired may be integrated into one combined component. Finally, the functionality of first through sixth components 610 through 660 of the ISRM system may be integrated into a single combined component for each particular or unique error condition, failing return code, problem or other issue that is being addressed. Using this approach, the arrival of a particular error condition or failing return code, for example, would cause the ISRCC supervisor 605 to invoke or call up and activate the integrated combined component that was written to handle that particular EC, failing RC or issue. One benefit of this approach is that the arrival of any given reported error condition or other issue would not interfere with the arrival, processing and disposition of other reported error conditions, problems or other issues that may also need to be addressed at substantially the same time as the first-to-arrive error condition or issue.

FIG. 7 illustrates an alternative ISRM subsystem 122' which, except for what is shown in FIG. 7, is like ISRM subsystem 122 in FIG. 6. The FIG. 7 embodiment is arranged to implement and illustrates an ISRM subsystem where multiple instances each of the components 610 through 660 shown in FIG. 6 are or may be provided. This arrangement is preferably used so that an instance of each component is dedicated to a specific newly arrived reported error condition as will be further explained shortly. In the FIG. 7 embodiment, all instances of the first component 610 are designated by the bracket 610', while the individual instances of the first component, of which there may be N, are designated as block 711, block 712 and blocks 713 through 719. The term N means any needed number. N may be up to several dozen or several hundred, or even a few thousand or more in a very large and complex IC fab or automated production facility. As is typical in object-oriented computer systems involving multiple instances of a given component, typically only as many instances as need to run (or are able to run due to computer systems limitations) will be activated at any one time. In other words, the number of actual instances of any given component that are running will be dependent upon how busy the ISRM subsystem 122' is at any given point in time.

The set 620' of second components 721-729 are shown to be associated with a corresponding number of active instances of command memory, individually labeled Mem EC-1 through Mem EC-N, which are identified collectively by bracket 128'. Similarly, sequencer 685 is shown with multiple instances individually labeled Seq EC-1 through Seq EC-N, which are identified collectively by bracket 685'. The dashed sets of lines behind lines 631 and 682 in FIG. 7 represent that these individual instances of the second components communicate with their respective individual instances of command memory 128' and sequencer 685'.

Similarly, set 630' of third components 731-739 and set 650' of fifth components 751-759 each include a corresponding number of active instances of the third and components which are also individually labeled for use with and are associated with reported, recognized error conditions EC-1 through EC-N. To reduce drawing clutter, the duplicate respective communication paths which would otherwise be shown behind solid lines 632 and 668 have been omitted from FIG. 7. Finally, set 640' of fourth components 741-749 and set 650' of sixth components 761-769 each include a corresponding number of active instances of the fourth and sixth components which are also individually labeled for use with instances associated with reported and recognized error conditions EC-1 through EC-N.

Part 6—Additional Applications

Different Types of Resolution or Recovery Programs, Processes or Agents: Different kinds of equipment or different kinds of transactions within a large manufacturing system may require different steps to be carried out in order to affect resolution or recovery from an error, problem or other issue. Accordingly, it may be useful to have multiple kinds of resolution or recovery programs, processes or agents, with each one being constructed to perform in an automated fashion the resolution or recovery operations that are associated with a particular kind or class of equipment (such as tools, transports or stockers) or carriers, since each may require in special handling, messaging or a custom sequence of operations or instructions in order to effect resolution or recovery. The use of two or more different resolution or recovery programs, processes and/or agents is to address one or more reported conditions within the scope of the present invention.

Synchronous and Asynchronous Uses: The issue resolution (ISR) system and methods and any resolution or recovery components of the present invention that are employed may be used synchronously. By "synchronous use" we mean a use where the ISR system performs or attempts to perform a certain resolution or recovery procedure, and will not send out one or more corrective commands to perform the next step in the sequence of steps in the resolution or recovery process until a positive confirmation is returned from the preceding step in the process. Alternatively, the multiple recovery steps or instructions may be sent out by the ISR system concurrently, or may be sent out at timed intervals, without waiting for response from or the completion of an earlier recovery steps by the same or different control system, tool, piece of equipment or carrier to which the instructions were directly or indirectly sent. These would be examples of what we characterized as an "asynchronous use" of the resolution or recovery agents or components of the present invention.

Reporting & Exceptions Activity: In FIGS. 6 and 7, an arrangement of components and memory for logging the results (or lack thereof) of issue resolution commands was disclosed. It is also within the scope of the present invention for the Issue Resolution Management (ISR) system to have one or more subprograms, functions, classes, objects, agent programs, components or still other functionality that provides data gathering and/or some form of statistics, for storage in an appropriate container or form, such as but not limited to a relational database, to collect information about reported incidents or issues, and its activities in responding to such errors, problems and other issues. Such subprograms, functions, classes, objects, agents or components could gather data from transaction managers, equipment managers, the RTD system and other systems and/or monitors regarding their operations. Such data may include resolution and/or recovery results achieved, volume and type of resolution or recovery operations pursued, levels of nesting employed in an effort to correct a reported problem, the number of resolution and recovery attempts identified and undertaken, and the like. The reporting of such data in turn would no doubt help the other systems provide useful reports to attending personnel. Such reports, which could be provided in response to a query, may also be used by the attending personnel to determine what happened and the order in which to give special attention to equipment or certain known problems. They also could be used to help determine whether corrective or preventative action need be taken at their end relative to the issues to which the ISR system responded.

Software Coding Implementations: It should be appreciated that in a run-time environment consisting primarily of programs using object-oriented programming (OOP) techniques, the ISRM system may be implemented as a component, and the associated agent programs, for example, those collecting data or maintaining an incident database of reported errors, problems or other issues may also be implemented as a component. Further, when the such agents are executing, they in effect become objects in such an environment. It should also be appreciated, as was discussed in connection with FIG. 7, that if desired more than one instance of any such component or agent may be provided. For example, if different pieces of systems, applications, equipment or different tools have specific attributes or functions which require different steps to implement an attempted resolution or recovery, it may be useful to provide different components or resolution agents specifically written to handle the required issue resolution and/or recovery tasks associated with particular piece of system, application, equipment, tool or carrier, or a particular class of like pieces of equipment or like tools or like carriers.

The present invention has been described with respect to an implementation based upon IBM's Standard SiView manufacturing execution system, a Brooks Automation RTD and a Muratec MCS, running on certain exemplary operating systems and/or computer hardware platforms. Yet, those in the art should appreciate that the systems and methods of the present invention may be utilized with any other known or suitable MES, RTD/Dispatcher and/or MCS, and other choices with respect to computer operating systems and hardware platforms. All that is required is that the ISR systems and methods of the present invention be arranged to integrate with the various software-based control systems, particularly the MES, MCS/AMHS and PCS, so as to able to run together as needed in an integrated fashion in order to generate, receive and/or accept commands and data as necessary to carry out the attempted issue resolution and recovery functions described above.

The systems and methods of the present invention need not be further described here since those skilled in the art, based on the teachings of the present invention, will readily understand how to implement the same. This in part is due to the widespread use of conventional MES, RTD, PCS and MCS/AMHS, and similar software systems and still other management and diagnostic/error recording software systems in modern automated manufacturing environments. Also, the widespread knowledge about and use of various communications protocols and messaging systems to exchange data and control information in IC fabs and other large computerized manufacturing systems and facilities makes it unnecessary to further explain the details of those communications processes. Moreover, any suitable programming approaches and/or other well-known communications and database protocols and software tools familiar to those writing industrial control system software programs, factory data acquisition programs, and/or management and/or automation system programs and/or components, may be used to implement the ISR systems and methods of the present invention. These programming approaches include using relational databases and object-oriented programming components, and distributed client/server computing and communications techniques. For example, servant programs may be provided on application servers so that the thin clients can be used on the local computing systems or microcontrollers associated with the equipment and tools being controlled. This is but one way to help efficiently code the software required to implement the ISR systems and methods of the present invention. As a second example, the systems and processes of the present invention may be written as programs or a set of interrelated routines in any suitable programming languages or set of languages, such as but not limited to object-oriented languages. Further, such client and server programs and/or routines may then be deployed to run under the control of any suitable management software package including but not limited to an operating system, a MES, a RTD, a MCS/AMHS or automated scheduler/dispatcher, if desired.

The present invention has been described in part by reference to block diagrams, flow diagrams and components or elements of systems and steps and substeps of methods. As is well known, suitable program instructions provided in software are used to turn general-purpose computers and/or processors into programmed computers and/or processors to form systems capable of carrying out the teachings of the present invention.

Firmware & Other Implementations: It should be appreciated by those skilled in the art that if desired, the systems, methods and software described herein may be implemented in part in firmware (including microcode) or hardware. Accordingly, the present invention may take the form of an embodiment including hardware and/or firmware, or an embodiment that is a combination of software, hardware and/or firmware. Further, the methods of the present invention may be carried out entirely in software, or in a combination of the software, hardware and/or firmware.

Tangible Media as an Implementation: Also, the software or other coding employed to implement the present invention may be provided in any suitable form of computer program code embodied in tangible media, such as but not limited to floppy diskettes, CD-ROMs, hard drives, static or flash memory, gate arrays, or any other computer readable storage medium. When such computer program code or other code, containing the needed instructions, is loaded into and is ready for execution by suitable computers/processors, such programmed computers/processors become an apparatus for practicing the invention. Thus, it should be appreciated that another embodiment of the present invention is the computer program code needed for carrying out the processes of the present invention when it is embodied in a tangible medium.

Applications Beyond IC Fabs: While the foregoing description has focused upon automated IC fabrication facilities, those skilled in the art will appreciate that systems and methods of the present invention have, in a broader sense, applicability to other automated plants employing extensive automation integrated by one or more supervisory programs, such as manufacturing execution systems and/or an automated material handling systems, and which handle any kind of discrete physical items. Such plants may include but are not limited to, factories with multiple machining centers, assembly plants, automated inspection facilities, and automated filling, packaging, sorting and/or shipping plants. Thus, as used herein and the claims below, the following terms should be understood to have the following meanings. The term "automated factory" and "automated manufacturing facility" should be understood in a broad sense to encompass any factory or facility including a testing facility, warehouse and distribution center where automated equipment, directed by automatic control systems with little or no human intervention, is employed to receive, make, assemble, process, refine, route, sort, test, package and/or in whole or in part on a repetitive basis like physical items or material. The terms "physical items or material" should be understood in a broad sense to include any class or classes of discrete items or material which have or has a physical manifestation and which are/is made, assembled, processed, treated, or handled by humans or automated machinery as part of its journey to its ultimate destination. The term "component" as used in connection with the systems and methods of the present invention includes but is not limited to modules, routines, subroutines, classes, objects, all or portions of client/server programs, and agent and/or proxy/stub software. Since all or portions of any component can be implemented in whole or in part as application specific integrated circuits (ASICs), including but not limited to field programmable gate arrays (FPGAs) or other forms of hardware and/or as firmware, the term "component", in its broader sense, should be understood to include them as well.

Further Variations/Additions: The foregoing detailed description shows that the exemplary embodiments of the present invention are well suited to fulfill the purposes above-stated. It is recognized that those skilled in the art may make various modifications or additions to the embodiments chosen to illustrate the present invention without departing from the spirit and proper scope of the invention. Accordingly, it is to be understood that the protection sought and to be afforded hereby should be deemed to extend to the subject matter defined by the appended claims, including all fair equivalents thereof.

What is claimed is:

1. In an automated manufacturing facility for running automatic production and having a plurality of pieces of automated equipment designed to carry out certain tasks and having interactive control systems, an automated issue resolution (ISR) system for automatically attempting to resolve identified issues that interfere with automatic production, the ISR system comprising:
   an automated issue resolution management (ISRM) system in communication with each of the interactive control systems, the ISRM directing attempts to automatically resolve issues including error conditions relating to the automated manufacturing facility and including a plurality of automated components whose operations the ISRM system is operable to coordinate, the components including;
   a recognized issue list containing a listing of return codes for a set of issues associated with the automated equipment;
   a first component for automatically checking the recognized issue list to determine whether a first reported issue brought to its attention is a recognized issue for which an automatic resolution appears to be available; and
   a plurality of second components for commanding the taking of automated corrective actions by corresponding portions of the automated manufacturing facility in response to reported issues recognized by the first component, each of the second components is respectively dedicated to attempting to resolve a different recognized issue;
   wherein one of the second components is selected, via a respective return code associated with the first reported issue, to direct a corresponding portion of the automated facility to implement an automated corrective action.

2. An issue resolution system as in claim 1, wherein the ISRM system further includes:
   a third component for determining whether the automated corrective action appears to have resolved the recognized issue; and
   a fourth component for logging whether the automated corrective action appears to have resolved the recognized issue.

3. An issue resolution system as in claim 1, wherein the second component of ISRM system further includes:
   a first subcomponent for determining whether art automated corrective action appears to be able to be taken at present; and
   a second subcomponent, in communication with the first subcomponent, for advising that an automated corrective action cannot be executed at present.

4. An issue resolution system as in claim 3, wherein the second subcomponent of second component is operatively arranged for advising via a first message that an automated corrective action cannot be taken because of a condition specifically identified in the first message.

5. An issue resolution system as in claim 4, wherein the second subcomponent of the second component is operatively arranged for advising via a second message that an automated corrective action cannot be taken because of at least one piece of automated equipment identified in the second message is not in automatic mode.

6. An issue resolution system as in claim 1, wherein the second component of the ISRM system further includes a first subcomponent for providing at least first and second courses of possible automated corrective action, and a second subcomponent for commanding the taking of the first course of possible automated corrective action, and then the taking of the second course of possible automated corrective action if needed.

7. An issue resolution system as in claim 1, further comprising:
   a third component for determining whether the automated corrective action that was commanded appears to have resolved the recognized issue; and wherein
   the third component includes a first subcomponent for providing a first message indicating whether the commanded automated corrective action appears to have resolved the issue, and
   the second component includes
      a first subcomponent for providing at least first and second possible automated corrective actions, and
      a second subcomponent for commanding the taking of the first possible automated corrective action, and then commanding the taking of the second possible automated corrective action if needed, and
      a third subcomponent for receiving the first message provided by third component and deciding whether the second subcomponent needs to command the taking of the second possible automated corrective action.

8. An issue resolution system as in claim 7, wherein the ISRM system further includes:
   a command memory for providing information pertinent to possible corrective actions with respect to at least a plurality of distinct recognized issues; and
   a command sequencer for helping generate at least first and second commands to initiate automated corrective actions in sequence as needed.

9. An issue resolution system as in claim 7, wherein the ISRM system further comprising:
   a fourth component for logging for future reference whether an automated corrective action that was commanded appears to have resolved the recognized issue;
   a fifth component for providing a message indicating which automated corrective action that was commanded appears to have resolved the recognized issue; and
   a sixth component, operatively arranged to receive a message from the fifth component, for logging for future reference at least part of the information contained in such received message.

10. In an automated manufacturing facility having interactive control systems which interface with pieces of automated equipment that carry out certain assigned tasks, an automated issue resolution (ISR) system in communication with the interactive control systems, the ISR system automatically attempting to resolve identified issues that interfere with automatic production, the ISR system comprising:
   a first component for automatically checking a recognized issue list to determine whether a first issue reported to its attention is a recognized issue for which an automatic resolution appears to be available, the recognized issue list containing a listing of return codes for a set of issues associated with the automated equipment; and
   a plurality of second components for automatically commanding the taking of automated corrective actions by corresponding portions of the automated manufacturing facility in response to reported issues recognized by the first component, each of the second components is respectively dedicated to attempting to resolve a different recognized issue;
   wherein one of the second components is selected, via the return code associated with the first reported issue, to direct a corresponding portion of the automated manufacturing facility to implement an automated corrective action.

11. An issue resolution system as in claim 10, further comprising:
a third component for determining whether the automated corrective action that was commanded appears to have resolved the reported issue that was recognized; and
a fourth component for logging whether the automated corrective action that was commanded appears to have resolved the reported issue that was recognized.

12. An issue resolution system as in claim 10, wherein the second component further includes:
a first subcomponent for determining whether an automated corrective action is able to be taken at present; and
a second subcomponent, in communication with the first subcomponent, for advising that an automated corrective action cannot be executed at present.

13. An issue resolution system as in claim 12, wherein the second subcomponent of second component is operatively arranged for advising via a first message that an automated corrective action that is being commanded cannot be taken because of a condition specifically identified in the first message.

14. An issue resolution system as in claim 13, wherein the second subcomponent of the second component is operatively arranged for advising via a second message that the automated corrective action being commanded cannot be taken because at least one piece of automated equipment is not in full automatic mode.

15. An issue resolution system as in claim 10, wherein the second component of the ISR system further includes a first sub component for providing at least first and second courses of possible automated corrective action, and a second subcomponent for commanding the taking of the first course of possible automated corrective action, and then the taking of the second possible corrective action if needed.

16. An issue resolution system as in claim 10, further comprising:
a third component for determining whether the automated corrective action that was commanded appears to have resolved the recognized issue; and wherein
the third component includes a first subcomponent for providing a first message indicating that the reported issue that was recognized no longer appears to be an issue, and
the second component includes
a first subcomponent for providing at least first and second possible courses of automated corrective action, and
a second subcomponent for automatically commanding the taking of the first course of possible corrective action, and then automatically commanding the taking of the second course of corrective action if needed, and
a third subcomponent for receiving the first message from the third component and deciding whether the second subcomponent needs to command the taking of the second course of automated corrective action.

17. An issue resolution system as in claim 16, wherein at least two of the second components each includes:
a first subcomponent for providing a least first and second courses of possible corrective action for its distinct recognized issue, and
a second subcomponent for commanding the taking of the first course of possible corrective action, and then commanding the taking of the second course of corrective action if needed with respect to its distinct recognized issue, and
a command memory for providing information pertinent to a plurality of courses of possible corrective actions with respect to distinct recognized issues, and
a command sequencer for helping generate at least first and second commands to initiate automated corrective actions in sequence as needed.

18. An issue resolution system as in claim 16, further comprising:
a fourth component for logging for future reference whether the automated corrective action that was commanded appears to have resolved the recognized issue;
a fifth component for providing a message indicating which automated corrective action that was commanded appears to have resolved the recognized issue; and
a sixth component, operatively arranged to receive messages from the fifth component, for logging for future reference at least part of the information contained in such messages.

19. An automated method of managing automatic recoveries from error conditions in an automated factory environment that has automated computerized control systems which control and supervise the operations of automated equipment therein, the method comprising the steps of:
(a) installing a supervisory program for managing attempts to recover automatically from selected error conditions reported by at least one of the control systems in the automated factory, the supervisory program including at least a plurality of sets of logic each dedicated to the resolution of a distinct recognized incoming error condition;
(b) determining, via a recognized issue list, whether incoming error conditions received by the supervisory program are recognized as issues for which an automatic resolution appears to be available, the recognized issue list containing a listing of return codes for a set of issues associated with the automated equipment;
(c) for the first incoming error condition that is so recognized in step (b), under the auspices of the supervisory program, accessing information associated with the incoming recognized error condition, via the logic corresponding the recognized error condition, to enable the generation of a first set of automated corrective commands; and
(d) under the auspices of the supervisory program, generating at least a first command for automated corrective action to be taken by a portion of the automated factory in an effort to resolve automatically the first recognized incoming error condition.

20. The automated method of recovering from error conditions as set forth in claim 19, further comprising the steps of:
(e) determining whether the automated corrective action taken appears to have resolved the recognized incoming error condition; and
(f) logging whether the automated corrective action which was taken appears to have resolved the recognized incoming error condition.

21. The automated method of recovering from error conditions as set forth in claim 20, further comprising the steps of:
(g) determining whether an automated corrective action is able to be taken at present; and
(h) advising that an automated corrective action cannot be executed at present.

22. The automated method of recovering from error conditions as set forth in claim 21, wherein step (h) includes:
   advising at certain times via a first message that an automated corrective action cannot be taken because of a condition at least partially identified in the first message, and
   advising at certain other times via a second message that an automated corrective action cannot be taken because of at least one piece of automation equipment is not in a required automatic mode.

23. The automated method of recovering from error conditions as set forth in claim 19, wherein the supervisory program has associated therewith a plurality of distinct recognized error conditions for which different sets of corrective commands associated with various automated corrective actions may be used in attempts to recover therefrom, and method further comprises, as part of step (d), the substeps of:
   (1) selecting at least a first course of possible automated corrective action, and generating, based at least in part thereon, a first set of commands to initiate the first course of automated corrective action, and
   (2) in the event that the recognized incoming error condition does not appear to have been corrected in response to the first set of commands, selecting a second course of possible automated corrective action, and thereafter generating, based at least in part thereon, a second set of commands to initiate the second course of automated corrective action.

24. The automated method of recovering from error conditions as set forth in claim 23, further comprising the steps of:
   (e) for a second incoming error condition that is so recognized in step (b), under the auspices of the supervisory program, accessing information associated with that recognized incoming error condition to enable the generation of at least a first set of automated corrective commands via the supervisory program distinct from the first set of automated corrective commands generated in response to the first incoming error condition recognized in step (b); and
   (f) under the auspices of the supervisory program, generating at least a first set of commands for initiating automated corrective action to be taken by a portion of the automated factory in an effort to resolve automatically the second recognized incoming error condition.

25. The automated method of recovering from error conditions as set forth in claim 24, that further comprises the following further steps:
   (g) in the event that first incoming error condition does not appear to have been corrected in response to the first set of commands generated automatically to recover from that first incoming error condition, sequentially thereafter automatically commanding the generation of a second set of commands associated with a second course of possible automated corrective action for that first incoming error condition, and
   (h) in the event that second incoming error condition does not appear to have been corrected in response to the first set of commands generated automatically to recover from that second incoming error condition, sequentially thereafter automatically commanding the generation of a second set of commands associated with a second course of possible automated corrective action for that second incoming error condition.

26. The automated method of recovering from error conditions as set forth in claim 19, wherein each of the plurality of sets of logic provide at least first and second courses of possible corrective action with respect to its distinct recognized error condition, and
   the method further includes the steps of:
   (e) for each distinct incoming recognized error condition, sequentially commanding the taking of the first course of possible corrective action for that error condition, and then commanding the taking of a second course of corrective action if the first course appears to have not resolved the error condition.

27. The automated method of recovering from error conditions as set forth in claim 26, wherein the supervisory program includes:
   a command memory for providing information pertinent to a plurality of courses of possible corrective actions with respect to distinct recognized incoming error conditions, and
   the method further includes the steps of:
   (f) for at least a plurality of recognized incoming error conditions, logging whether the incoming error conditions appear to have been automatically corrected; and
   (g) for at least a plurality of recognized incoming error conditions, logging which corrective commands out of a plurality of possible corrective commands appear to have been responsible for automatically effecting correction of the error conditions.

28. A computer program product, to be used in an automated factory environment that has automated computerized control systems which control and supervise the operations of the factory and pieces of automated equipment therein, for implementing an automated method for managing automatic recoveries from error conditions, the software product comprising:
   a storage medium readable by at least one processing circuit and storing instructions for execution by the processing circuit for performing the method comprising the steps of
   (a) installing a supervisory program for managing attempts to recover automatically from selected error conditions reported by at least one of the control systems in the automated factory, the supervisory program including at least a plurality of sets of logic each dedicated to the resolution of a distinct recognized incoming error condition;
   (b) determining, via a recognized issue list, whether incoming error conditions received by the supervisory program are recognized as issues for which an automatic resolution appears to be available, the recognized issue list containing a listing of return codes for a set of issues associated with the automated equipment;
   (c) for the first incoming error condition that is so recognized in step (b), under the auspices of the supervisory program, accessing information associated with the incoming recognized error condition, via the logic corresponding the recognized error condition, to enable the generation of a first set of automated corrective commands; and
   (d) under the auspices of the supervisory program, generating at least a first command for automated corrective action to be taken by a portion of the automated factory in an effort to resolve automatically the first recognized incoming error condition.

* * * * *